United States Patent
Stern

(10) Patent No.: US 8,837,652 B2
(45) Date of Patent: Sep. 16, 2014

(54) RECEIVER SYNCHRONIZATION IN RADIO COMMUNICATION SYSTEMS EMPLOYING TRANSMIT DIVERSITY

(75) Inventor: Martin Stern, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 731 days.

(21) Appl. No.: 12/983,020

(22) Filed: Dec. 31, 2010

(65) Prior Publication Data
US 2012/0170680 A1     Jul. 5, 2012

(51) Int. Cl.
| | | |
|---|---|---|
| *H04B 1/00* | (2006.01) | |
| *H04L 5/00* | (2006.01) | |
| *H04L 27/26* | (2006.01) | |

(52) U.S. Cl.
CPC ......... *H04L 27/2613* (2013.01); *H04L 27/2662* (2013.01); *H04L 5/0039* (2013.01); *H04L 5/0048* (2013.01)
USPC ........... 375/350; 375/133; 375/267; 375/343; 375/347; 375/349

(58) Field of Classification Search
CPC ........... G01R 13/0272; H03H 17/0251; H03H 17/04; H03H 27/2613; H03H 27/2657
USPC ......... 375/130–137, 229–236, 260–273, 278, 375/285, 316, 322–326, 334–338, 340–343, 375/346–351, 354–362, 364
See application file for complete search history.

(56) References Cited

U.S. PATENT DOCUMENTS

| | | | |
|---|---|---|---|
| 3,488,445 A | 1/1970 | Chang | |
| 6,700,919 B1 | 3/2004 | Papasakellariou | |
| 6,785,513 B1 * | 8/2004 | Sivaprakasam | 455/63.1 |
| 7,602,696 B2 * | 10/2009 | Rhodes | 370/208 |
| 2003/0053493 A1 | 3/2003 | Mobley et al. | |
| 2003/0053522 A1 | 3/2003 | Hayoun et al. | |
| 2003/0162518 A1 | 8/2003 | Baldwin et al. | |

(Continued)

FOREIGN PATENT DOCUMENTS

WO    WO 2009/018655 A1    2/2009

OTHER PUBLICATIONS

Wang et al.; "A Novel Scheme for Symbol Timing in OFDM WLAN Systems;" ECTI Transactions on Electrical Engineering; Electronics & Communications; vol. 3, No. 2; Aug. 2005; pp. 86-91.

*Primary Examiner* — Sam K Ahn
*Assistant Examiner* — James M Perez
(74) *Attorney, Agent, or Firm* — Daly, Crowley, Mofford & Durkee, LLP

(57) ABSTRACT

According to one or more embodiments, multiple transmitters may simultaneously transmit orthogonal acquisition sequences with certain frequencies zeroed out, such that receivers receiving a signal (waveform) may separate the signal into the orthogonal sequences based on which frequencies are zeroed out to perform acquisition processes. For example, each transmitter may simultaneously transmit an orthogonal acquisition sequence with certain tones zeroed out depending upon which transmitter transmits the symbol. A particular receiver may then receive a signal, and filter it to produce a plurality of filtered signals that distinguish orthogonal acquisition sequence symbols based on which tones are zeroed out within the symbols. The particular receiver may synchronize with a particular transmitter in response to detecting an orthogonal acquisition sequence within one of the filtered signals and correlating the detected sequence to the particular transmitter based on from which of the plurality of filtered signals the orthogonal acquisition sequence is detected.

16 Claims, 25 Drawing Sheets

(56) References Cited

U.S. PATENT DOCUMENTS

| | | |
|---|---|---|
| 2004/0013177 A1* | 1/2004 | Sorrells et al. ............... 375/219 |
| 2005/0249319 A1 | 11/2005 | Suh et al. |
| 2005/0254596 A1 | 11/2005 | Naguib |
| 2005/0286466 A1* | 12/2005 | Tagg et al. ................... 370/329 |
| 2006/0121862 A1 | 6/2006 | Cornwall et al. |
| 2006/0210070 A1 | 9/2006 | Reznik et al. |
| 2006/0222095 A1 | 10/2006 | Niu et al. |
| 2007/0047433 A1 | 3/2007 | Kao |
| 2008/0205540 A1* | 8/2008 | Takeda et al. ................ 375/267 |
| 2008/0219211 A1 | 9/2008 | Franceschini et al. |
| 2008/0273537 A1* | 11/2008 | Meylan et al. ............... 370/394 |
| 2008/0291821 A1 | 11/2008 | Dent |
| 2009/0086752 A1 | 4/2009 | Anderson et al. |
| 2010/0061493 A1* | 3/2010 | Takahashi et al. ............ 375/343 |
| 2010/0073149 A1* | 3/2010 | Goldfisher et al. ...... 340/310.12 |
| 2010/0265999 A1 | 10/2010 | Stern et al. |

* cited by examiner

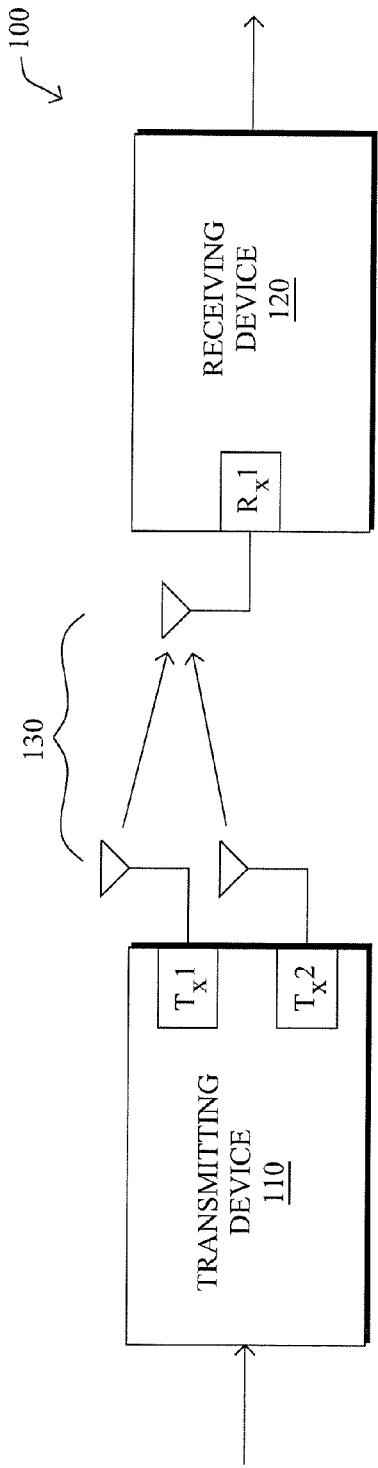
FIG. 1A (MISO)
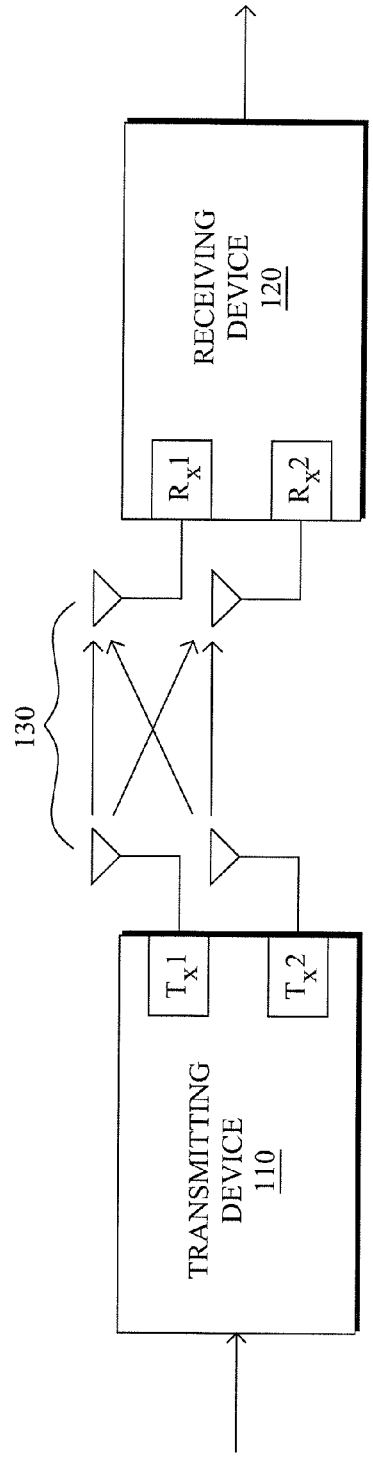
FIG. 1B (MIMO)

RECEIVER SYNCHRONIZATION IN RADIO COMMUNICATION SYSTEMS EMPLOYING TRANSMIT DIVERSITY

TECHNICAL FIELD

The present disclosure relates generally to radio communication, and, more particularly, to receiver synchronization in radio communication systems employing transmit diversity.

BACKGROUND

Wireless communication receivers, particularly digital wireless communication receivers, must generally be synchronized in time and frequency with a particular received to communication signal in order to be able to correctly parse the particular signal from other signals or noise throughout the radio frequency (RF) spectrum. For example, for any given (e.g., expected) time and frequency, due to propagation delays, frequency shifts, multipath deflection, etc., as will be appreciated by those skilled in the art, a receiving device often needs to align ("tune") its acquisition of the transmitted signal to account for these various offsets from the expected results.

Accordingly, in many communication systems, at the start of each communication, a preamble or "acquisition sequence" may be transmitted from a transmitting device such that any interested receiver may detect the transmission and synchronize to it. For instance, these acquisition sequences may be generally known communication signal structures that facilitate waveform acquisition processing through unique timing and frequency properties. The remainder of the transmitted data (e.g., the payload) may then be transmitted and received based on the synchronization, with optional "pilot" sequences dispersed throughout the payload to ensure that the transmitter and receiver remain synchronized (e.g., due to environmental changes, movement of the devices, etc.).

For certain radio communications, transmit diversity may be used to improve communication performance. For instance, multiple-input and single-output (MISO) technology is the use of multiple antennas/transmitters at a transmitting device and a single antenna/receiver at a receiving device, while multiple-input and multiple-output (MIMO) technology involves the use of multiple antennas at both the transmitter and receiver. Transmission diversity is particularly useful in wireless communications because it offers significant increases in data throughput and link range without additional bandwidth or transmit power. Specifically, this may be achieved by higher spectral efficiency (more bits per second per hertz of bandwidth) and link reliability or diversity (reduced fading). In other words, MIMO and MISO systems are multi-transmitter communications systems where typically all transmitters (e.g., 2, 3, 4, etc.) transmit signals simultaneously on the same bandwidth (at the same time and on the same frequencies). Note that only some of all of the signals may be received, e.g., due to fading channels, hence the usefulness of MIMO and MISO, where there may be multiple different possibilities to communicate (e.g., a "4×4" MIMO with 4 transmitters×4 receivers=16 communication possibilities).

Receivers in a transmit diversity scheme generally need to acquire each of the multiple transmitters separately in order to understand the overlapping transmitted signals. That is, the receivers are unable to de-conflict/recover the multiple signals until synchronizing to each of the separate transmitters. The acquisition sequence (preamble) mentioned above, however, is typically useful only for single antenna transmission, and not for transmit diversity. For instance, in systems which transmit from multiple antennas to provide transmit diversity, synchronization signals from the multiple antennas would be superposed on a single receive antenna, and thus would generally interfere with one another.

Various solutions have been utilized to allow receivers in a transmit diversity architecture to acquire (synchronize to) the multiple transmitters, but each has had its own drawbacks. For example, in one approach, the synchronization structure may be transmitted from only a single antenna, such that receivers may use a single correlator to detect the structure. This approach, however, provides no diversity benefit, possibly allowing for the synchronization structure to be lost (e.g., faded), and also wastes the power from one or more transmitters. In another approach, a first antenna may transmit the sequence, and when complete, a second antenna may transmit a sequence, etc., such that each antenna's (transmitter's) sequence does not overlap with another antenna's. This, unfortunately, multiplies the time required to acquire each antenna with the number of antennas, thus doubling for two antennas, tripling for three antennas, etc. Alternative approaches require computationally expensive algorithms, such as transmitting distinct pseudonoise structures from each antenna, and using multiple correlators to detect the superposed structures. This computationally expensive approach allows the synchronization structures to interfere, but incurs a resulting performance degradation. Also, an even more computationally expensive approach involves transmitting orthogonal synchronization structures from multiple antennas, such as orthogonal acquisition waveforms for orthogonal frequency division multiplexing (OFDM), and using multiple correlators to detect the structures. This approach, while providing superior performance, is the most computationally expensive approach.

Acquiring a signal (receiver synchronization) has thus been the weakest link for transmit diversity technologies, particularly without providing acquisition (synchronization) processing circuitry that is vastly more complex than the circuitry required to demodulate the synchronized data signal itself.

SUMMARY

According to one or more embodiments described herein, multiple transmitters may simultaneously transmit orthogonal acquisition sequences with certain frequencies zeroed out, such that a receiver receiving a signal (waveform) may separate the signal into the orthogonal sequences based on which frequencies are zeroed out to perform its acquisition processes (e.g., simultaneously). Specifically, in one embodiment, each of a plurality of transmitters may simultaneously transmit an orthogonal acquisition sequence with one or more symbols generated with certain tones of a plurality of tones zeroed out depending upon which of the plurality of transmitters is transmitting the symbol. As such, in this embodiment, a particular receiver may receive a signal, and filter it to produce a plurality of filtered signals that distinguish orthogonal acquisition sequence symbols based on which tones are zeroed out within the symbols. Accordingly, the particular receiver may synchronize with a particular transmitter of the plurality of transmitters in response to a) detecting an orthogonal acquisition sequence within one of the filtered signals and b) correlating the detected orthogonal acquisition sequence to the particular transmitter based on from which of the plurality of filtered signals the orthogonal acquisition sequence is detected.

In accordance with one aspect of particular embodiments, a delay and add filter may be used to separate out the acquisition sequences. For example, if either the even or the odd frequencies are zeroed out for an acquisition sequence (e.g., two transmitters), a delay and add filter may be configured to add or subtract the second half of a symbol to/from the first half in order to distinguish the symbols originated by the transmitters.

Also, in accordance with another aspect of particular embodiments, complexity reducing transformations may be performed on the received acquisition sequences to simplify the processing. For example, once a signal is separated into multiple streams corresponding to the plurality of diverse transmitters, the receiver may reduce the complexity of the streams into +/− data values (e.g., a sign bit of the data). Also, in certain embodiments where a sequence comprises a plurality of symbols, the symbols may be processed separately.

Further, in accordance with still another aspect of particular embodiments, transmission security (transec) techniques may be applied to the acquisition sequences that are an extension to the separation of the streams/symbols.

Advantageously, the techniques herein provide for full synchronization performance with particularly low computation expense when transmit diversity is utilized. In particular, by generating distinguishable synchronization sequences using pseudonoise excitation of a discrete Fourier transform based on only certain frequencies (e.g., even or odd), the novel techniques allow for simplified synchronization for diverse transmitters (e.g., MIMO/MISO), as well as allowing for simultaneous acquisition to the diverse transmitters, alleviating the need for increased (multiplied) acquisition times. In addition, by separating the acquisition sequences at the transmitters based on different frequencies, the receivers' processing to separate the sequences is simplified. Further simplification may be achieved through, e.g., reduction of diversity correlator precision subsequent to the separation of orthogonal synchronization components, as well as through processing each symbol separately and non-coherently combining the results. These simplifications allow for the processing cost for acquisition in transmit diversity topologies to be equal to or less than the processing cost for receiving the data in the transmit diversity topologies (that is, no more complex processing is required than that to simply receive and recover the data itself).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1A-B illustrate example communication networks with transmit diversity;

DESCRIPTION OF EXAMPLE EMBODIMENTS

Figure 2A:
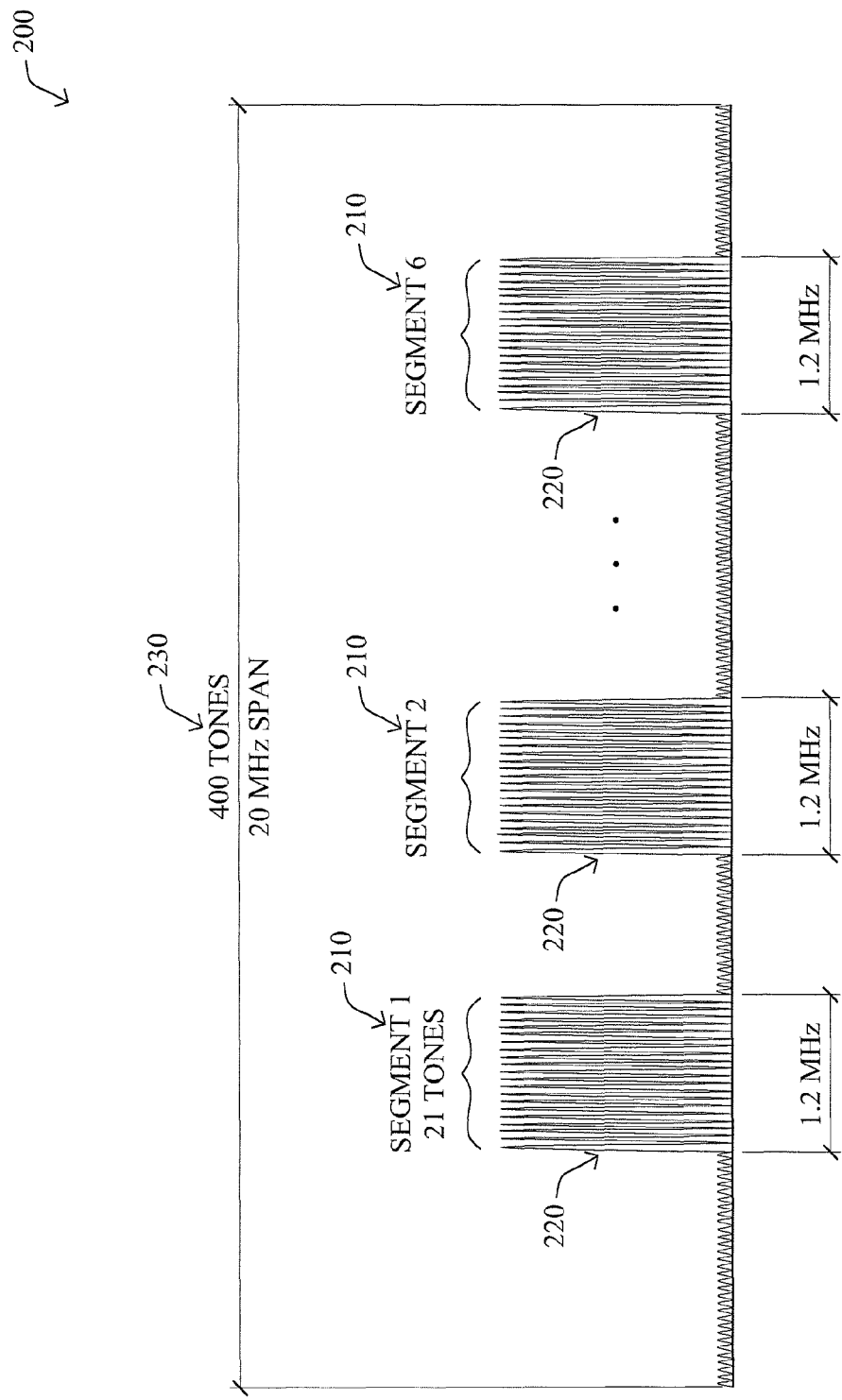
FIG. 2A illustrates a diagram of one example of an OFDM waveform structure.

FIGS. 1A and 1B are simplified schematic block diagrams of an example communication network 100 (a+b, respectively), illustratively comprising a transmitting device 110 and at least one receiving device 120 interconnected generally by wireless communication. For instance, the wireless signals 130 may be propagated from particular transmitters/antennas (e.g., Tx1 and Tx2) to receivers/antennas (e.g., Rx1 and Rx2). The transmitting and receiving devices, such as radios, mobile phones, computers, etc., may be in communication with each other via the wireless communication medium based on, e.g., distance, signal strength, current operational status, location, etc. Those skilled in the art will understand that any number of devices may be used in a communication network, and that the view shown herein is for simplicity. As described below, FIG. 1A represents a multiple-input single-output (MISO) configuration, and FIG. 1B represents a multiple-input multiple-output (MIMO) configuration, both examples of transmit diversity schemes.

Data communications (signals 130) may comprise packets, frames, information, audio signals, video signals, etc., and may generally be considered to be digital communication for the purposes of the embodiments herein. The signals 130 may be exchanged among the devices of the network 100 using predefined wireless communication protocols such as, e.g., IEEE Std. 802.11, IEEE Std. 802.15.4, WiFi, WiMax (IEEE Std. 802.16e), Bluetooth®, various proprietary protocols, etc. In this context, a protocol consists of a set of rules defining how the nodes interact with each other.

Figure 2B:
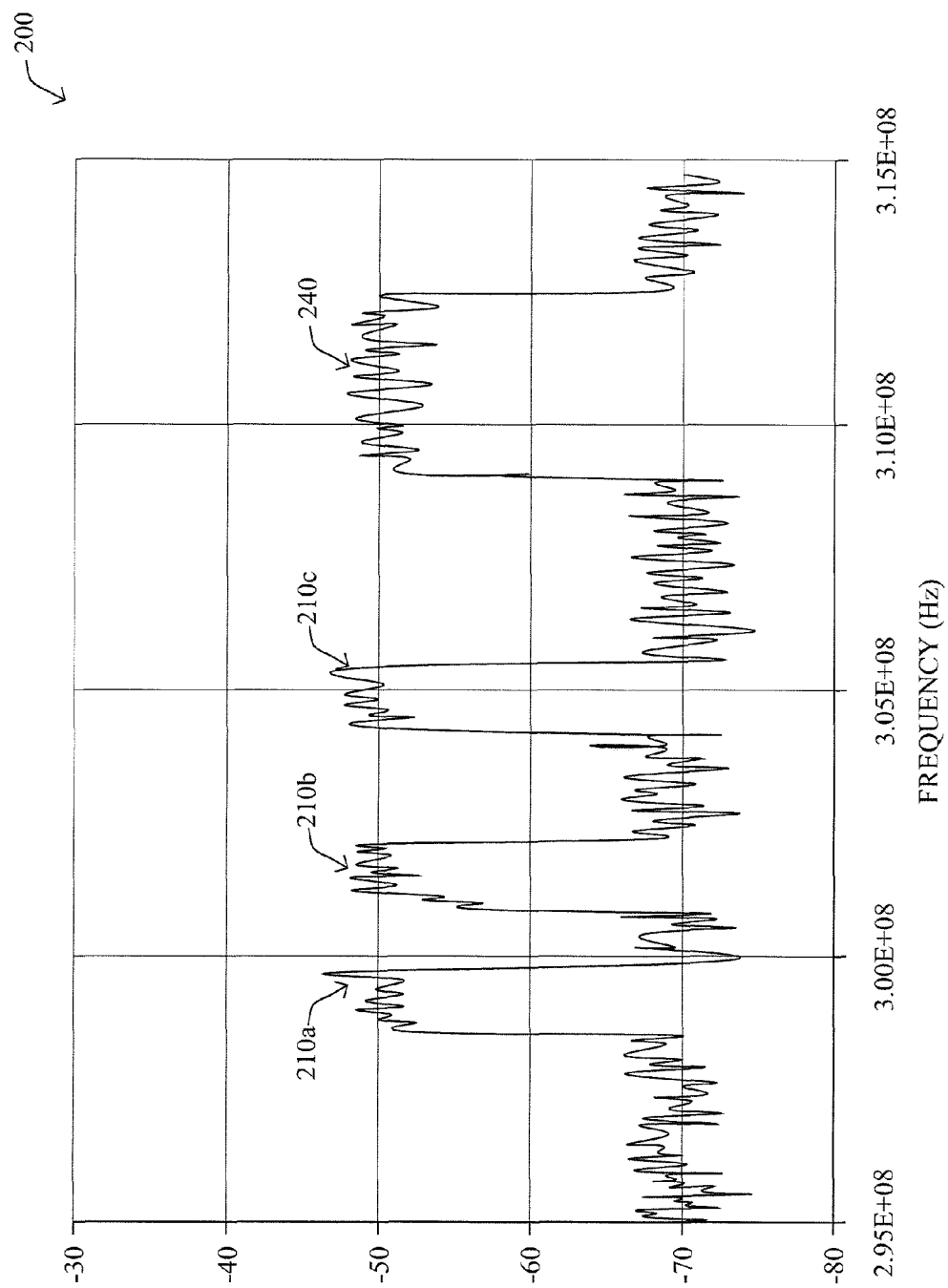
FIG. 2B illustrates a representation of one example of a six segment channel allocation of the OFDM waveform of FIG. 2B.

In particular, according to one or more embodiments herein, a communications signal waveform may be implemented using orthogonal frequency division multiplexed (OFDM) symbols with physical layer time division multiple access (TDMA) channel access. The physical layer packets may be constructed from sequences of OFDM symbols with periodic channel probes, e.g., "pilot" symbols. Referring to FIG. 2A, there is illustrated one example of an OFDM waveform 200 in accordance with one embodiment. In one example, the OFDM waveform operates in up to six 1.2 MHz bandwidth channel segments 210, as shown in FIG. 2A. Bandwidth allocation of multiple 1.2 MHz segments allows for compatibility with military spectral planning requirements; however it is to be appreciated that segments of other sizes may be used. In addition, the waveform may incorporate more or fewer than six channel segments 210. In one example, each 1.2 MHz channel segment 210 includes 21 contiguous carriers 220, referred to as "tones," with a 50 kHz tone spacing. Again, it is to be appreciated that the number of tones as well as the tone spacing may be varied according to user specifications or other design requirements as are not limited to the specific examples given herein. In one example, the OFDM waveform structure is implemented with an instantaneous bandwidth, or total span, 230 of 20 MHz or 400 tones within which the six channel segments 210 are allocated. It is to be appreciated that the total span 230 may be greater or less than 20 MHz depending, for example, on the overall system design parameters and specifications. The channel segments 210 may be arbitrarily located anywhere within the 20 MHz span 230, provided that no two segments overlap. The channels segments may be contiguous or not. FIG. 2B illustrates an example of a six segment channel allocation in which three of the segments 210a, 210b and 210c are not contiguous and three segments are to contiguous, as illustrated by signal portion 240.

Figure 3A:
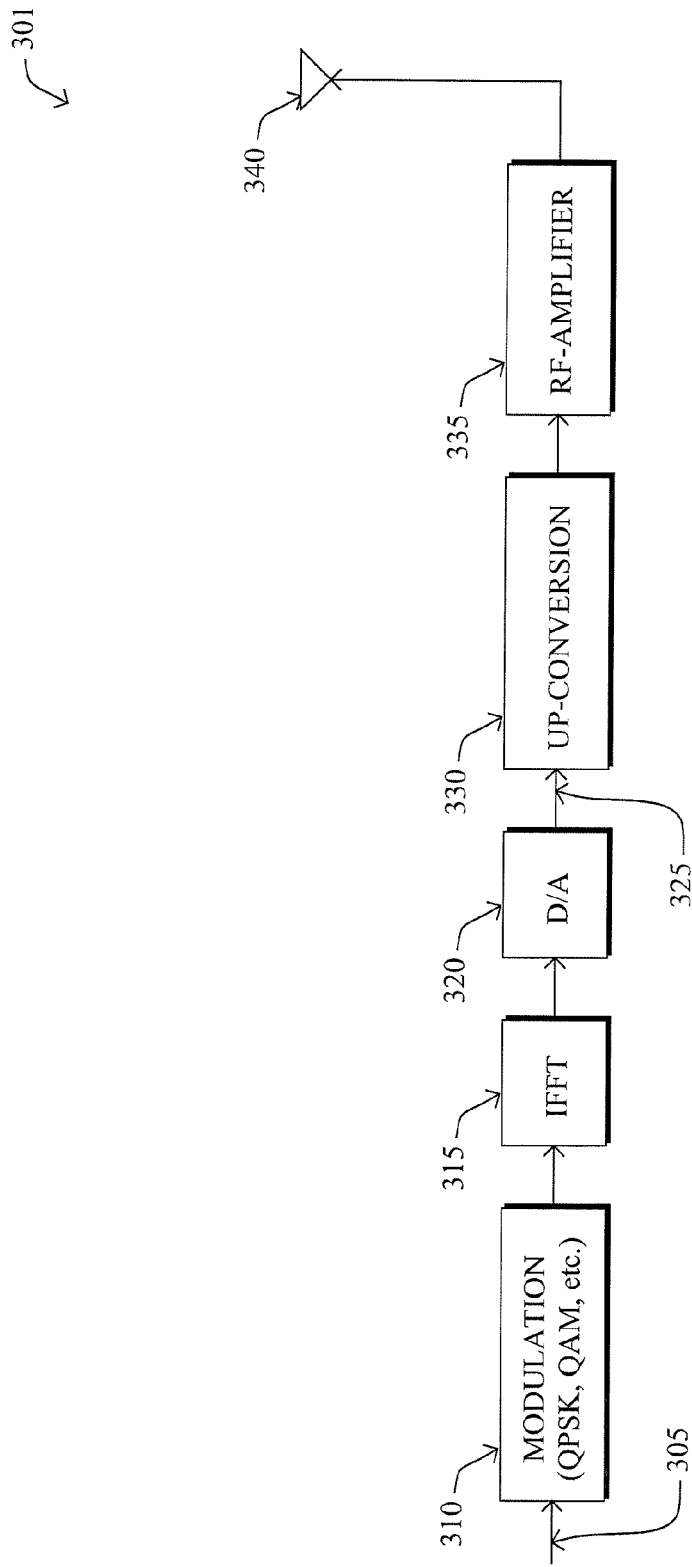
FIG. 3A illustrates a block diagram of an example transmitter configured to generate an OFDM waveform.

According to one embodiment, the OFDM symbols may be generated using an inverse fast Fourier transform (iFFT) algorithm. Referring to FIG. 3A there is illustrated a block diagram of one example of a transmitter configured to generate the OFDM symbols. The transmitter 301 (110) receives input data 305 that is to be transmitted, and a modulator 310 modulates the data according to a chosen modulation scheme such as, for example, Binary Phase Shift Keying (BPSK), Quadrature Phase Shift Keying (QPSK), or Quadrature Amplitude Modulation (QAM). An IFFT module 315 computes the iFFT of the modulated data, thereby creating a corresponding OFDM symbol and converts the modulated data from the frequency domain into the time domain. A digital to analog converter 320 converts the signal from the iFFT module 315 into an analog baseband OFDM signal 325. The baseband OFDM signal is up-converted in frequency by module 330 in preparation for wireless transmission, then amplified using an RF amplifier 335 and provided to an antenna 340 for transmission.

Figure 3B:
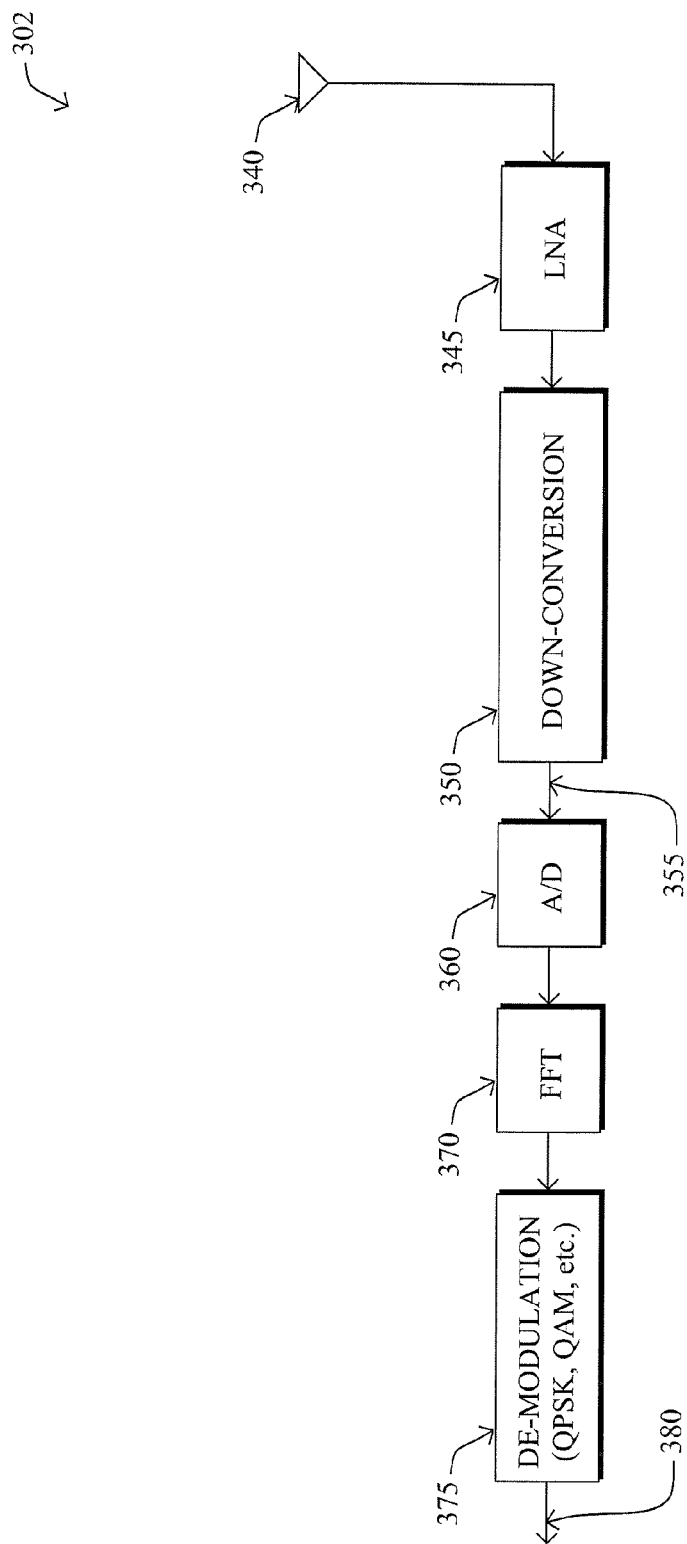
FIG. 3B illustrates a block diagram of an example receiver configured to receive and decode an OFDM waveform.

Similarly, on the receiver side, as shown in FIG. 3B, the signal is received by the antenna 340 of a receiver 302 (120), amplified using a low noise amplifier 345, and down-converted in frequency by module 350 to provide the baseband OFDM signal 355. An analog-to-digital converter 360 is used to convert the OFDM signal 355 into digital OFDM symbols and an FFT module 370 computes the fast Fourier transform (FFT) of the OFDM symbol to convert the signal from the time domain into the frequency domain. The signal is then demodulated using demodulator 375 to provide the output data 380.

Figure 4:
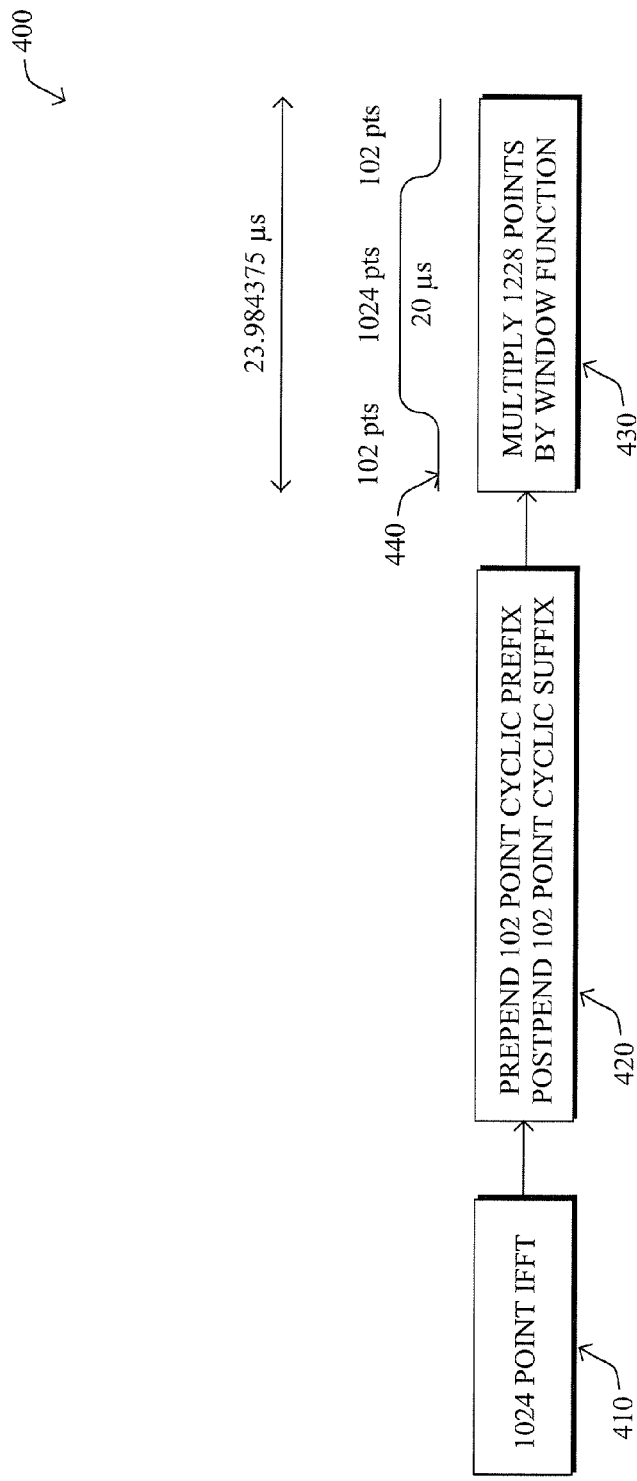
FIG. 4 illustrates a block diagram of an example process for constructing a windowed OFDM symbol.

In one embodiment, each OFDM symbol may be created using a 1024 point iFFT. Using the iFFT provides an efficient implementation for the OFDM waveform and provides flexibility to easily adapt the waveform to different modulation schemes and/or data rates to support changing link conditions. In one example, each iFFT (OFDM symbol) may include a windowed cyclic extension to reduce inter-symbol interference due to multipath effects in the wireless link. Cyclic extension includes appending a prefix and a postfix to each symbol, as discussed further below. Referring to FIG. 4, there is illustrated a block diagram of a process 400 for constructing a windowed iFFT to generate an OFDM symbol. This process may be used for each symbol in the physical layer packet. In a first step 410, the iFFT module 315 computes a 1024 point iFFT to generate the corresponding OFDM symbol. In a next step 420, the cyclic extension is implemented. In one example, the cyclic extension includes appending a 102 point cyclic prefix and a 102 point cyclic postfix to the symbol created at step 410, resulting in a 1228 point extended iFFT. The 1228 point extended iFFT is then multiplied by a window function (step 430) to improve spectral characteristics of the symbol. In one example, the window function 440 is a raised cosine window, as illustrated in FIG. 4. In one example, for a 20 microsecond (µs) base 1024 iFFT and two 102 point extensions, cyclic extension was shown to provide approximately 2 µs of multi-path delay mitigation.

Figure 5:
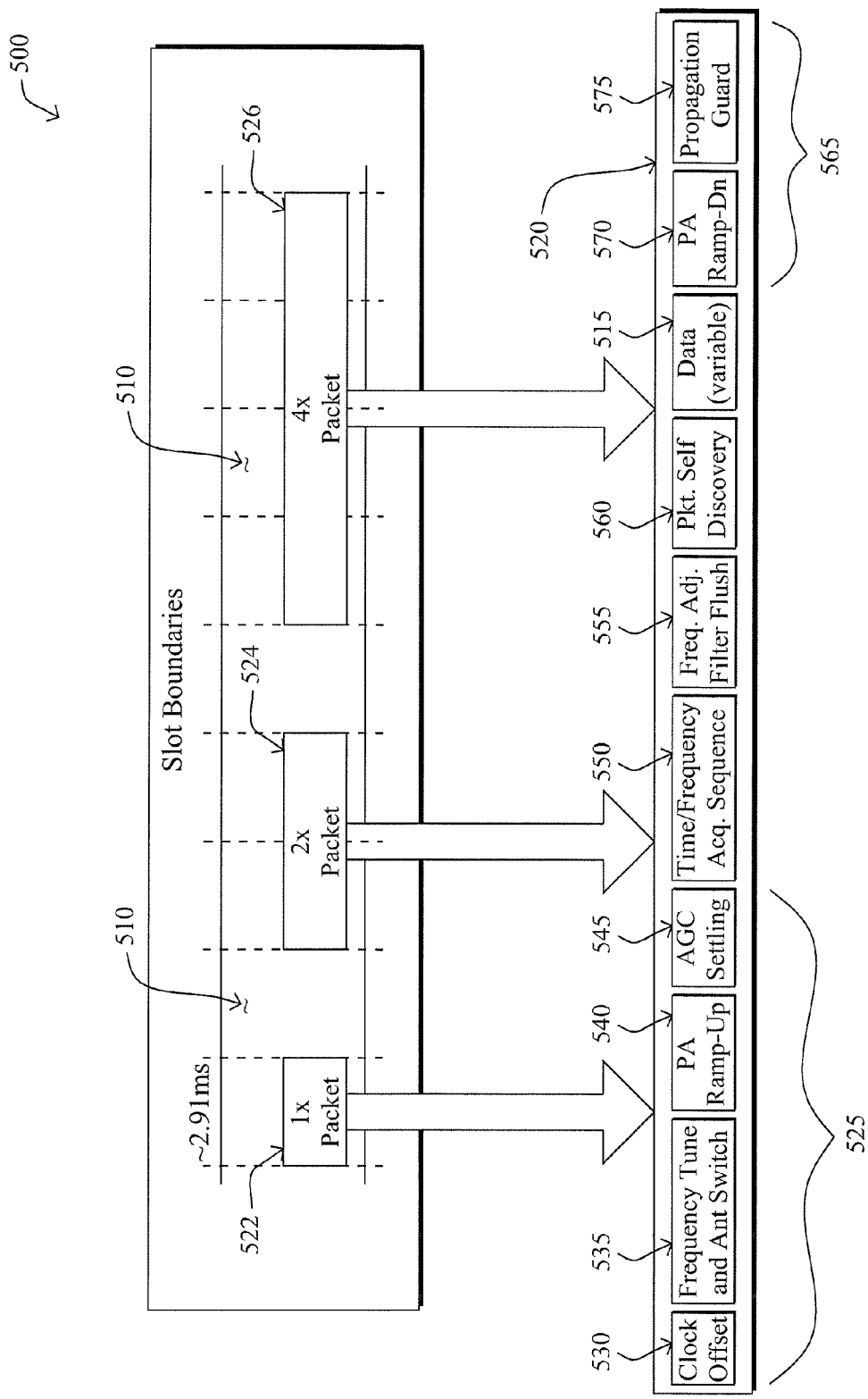
FIG. 5 illustrates a block diagram showing an example of a TDMA channel access structure with a physical layer packet structure for the waveform.

As discussed above, the waveform includes a TDMA channel access structure in which a communication channel of a given frequency or range of frequencies is divided into different time slots. One example of a TDMA channel access structure is illustrated in FIG. 5. The channel 500 is divided into a plurality of time slots 510. In one example, each time slot 510 has a duration of 2.91 milliseconds (ms), resulting in 344 time slots per second; however, it is to be appreciated that the length of each time slot may be greater or less than 2.91 ms. In one embodiment, the slots may be synchronized to a GPS signal of one pulse per second; however, it is to be appreciated that the GPS signal may have a different duration. As shown in FIG. 5, packets 520 of the waveform may occupy a different number of slots depending on the size of the data segment of the packet. In one embodiment, packets can be configured into three different sizes: short packets 522 occupying a single time slot, medium packets 524 occupying two time slots, and long packets 526 occupying four time slots. It is to be appreciated, however, that packets 520 may be configured in more or fewer than three different sizes and the different sizes may be defined differently from the above example. Each packet 520 may have the same physical layer structure, an example of which is illustrated in FIG. 5, regardless of the number of slots the packet occupies. The size of the data segment 515 varies depending on the number of slots allocated to the packet, such that the medium and long packets 524, 526 carry more data, but the overall structure remains constant.

Still referring to FIG. 5, there is illustrated an example of a physical layer packet structure of an embodiment of the waveform. The packet 520 is divided into various segments that perform different functions within the communications system. The packet 520 includes an initial group of segments 525 that are "filler" bits designed to accommodate any "wake-up" time in the receiver when the packet is received. The digital content of these filler segments may be unimportant. The group 525 includes a clock offset segment 530, a frequency tuning and antenna switch segment 535, a power amplifier ramp-up segment 540, and an Automatic Gain Controller (AGC) settling segment 545. The packet 520 further is includes a time/frequency acquisition segment 550 which contains OFDM symbols used for waveform timing synchronization and frequency error estimation, as discussed further below. A frequency adjustment/filter flush segment 555 is another "filler" segment that provides time for the receiver filters to be flushed after applying frequency correction and automatic gain control. The packet 520 further includes a packet self discovery segment 560, and end group 565 of additional filler segments including a power amplifier ramp-down segment 570 and a propagation guard segment 575, each of which is discussed further below. The data (or payload) segment 515 contains the actual data/information desired to be conveyed from the transmitting node to the receiving node in the network and, as discussed above, has variable size depending on the number of slots used by the packet 520.

As discussed above, embodiments of the waveform may be used in transmitters and receivers that are implemented in nodes of a mobile/wireless network. Accordingly, in one embodiment, the clock offset segment 530, which may also be referred to as a guard time segment 530, is used to account for timing uncertainty between nodes in the network. In some embodiments, the receiver uses an external GPS reference for timing information and to synchronize the slots 510. If the GPS connection is lost, an on-board receiver clock can be used for the timing information. However, the on-board clock may not be as accurate as the external GPS reference, and clocks on different nodes will tend to drift apart over time, causing timing uncertainty. For example, if two different nodes are not synchronized, one node may be transmitting before the other node expects to receive the signal. Therefore, the guard time segment 530 may be used to prevent any loss in data due to such clock drift by adding delay time to account for any early transmissions. In one example, the length of the guard time segment 530 may be sufficient to account for clock drift over a 24 hour period so as to permit continuous operation for 24 hours without GPS synchronization. Other sources of time synchronization may also be used, such as network based timing information, accurate clocks (e.g., atomic), etc., and GPS is merely one example.

Figure 6:
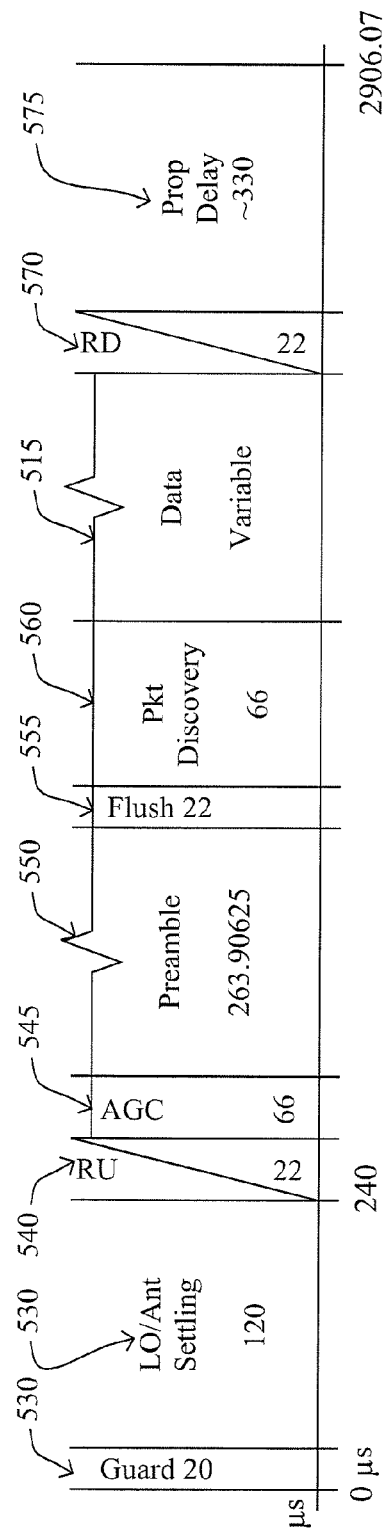
FIG. 6 illustrates a timing diagram for one example of a single slot packet having the physical layer structure of FIG. 5.

FIG. 6 illustrates an example of a timing diagram for a single slot packet 520 and a slot length of 2910 μs. As shown in FIG. 6, in one example, the clock offset segment 530 may have a duration of approximately 20 μs. The propagation guard (or propagation delay) segment 575 may perform a similar function to the clock offset segment 530, namely adding is delay time to prevent loss of data. In particular, the propagation guard segment 575 adds delay time to account for propagation delay between the transmitting and receiving nodes and thereby prevent loss of data. In one example, the propagation guard segment 575 may be about 330 μs in duration to account for a distance of up to 100 kilometers (km) between nodes.

The frequency tuning and antenna switch segment 535 allows time for the transceiver to be tuned and configured for the current time slot. This includes switching the antenna to the appropriate mode (e.g., from transmit to receive), tuning a local oscillator to the desired frequency band, as well as any other tuning and/or switching that may be necessary to configure the transceiver to receive the packet, and accounts for stabilization and settling of all tuning and switching transients. In one example, the frequency tuning and antenna switch segment 535 has a duration of approximately 120 μs. The power amplifier ramp-up and ramp-down segments 540, 570 account for delays in the turn-on and turn-off time of the power amplifier in the transmitter. The transmit bursts can be digitally controlled to contain the power spectral density and reduce transient off-channel emissions. In one example, each of the power amplifier ramp-up and ramp-down segments 540, 570 are approximately 22 μs in duration. The AGC settling segment 545 provides time for transmitter power stabilization and receiver automatic gain controller settling prior to signal synchronization and demodulation. In one example, the AGC settling segment 545 is about 66 μs in duration.

Still referring to FIGS. 5 and 6, the time/frequency acquisition segment 550 (also called the preamble) contains OFDM symbols used for waveform timing synchronization and frequency error estimation. The preamble segment 550 is constructed to have very good auto-correlation properties to allow for time and frequency synchronization. The synchronization, or signal acquisition process is used by the receiver to resolve time and frequency offsets on each packet prior to demodulation. As discussed above, in some embodiments the receiver may use a GPS signal for coarse timing synchronization within the TDMA network. However, this GPS-based timing may be insufficient (or unavailable) to accurately demodulate the signal, as demodulation may require very precise time resolution, for example, on the order of 100 ns RMS. Accordingly, as discussed above, the transmitter inserts information into the waveform from which the receiver can accurately locate the signal in time and frequency. Furthermore, in a typical wireless network, frequency offsets between the receiver and the received waveform arise due to, for example, oscillator error and/or Doppler shift as a result of the relative velocities between nodes. In one embodiment, the receiver first correlates to the preamble segment 550 and after successful time acquisition, then calculates the frequency error and adjusts the digital synthesizer to remove the frequency offset, as discussed further below.

Figure 7A:
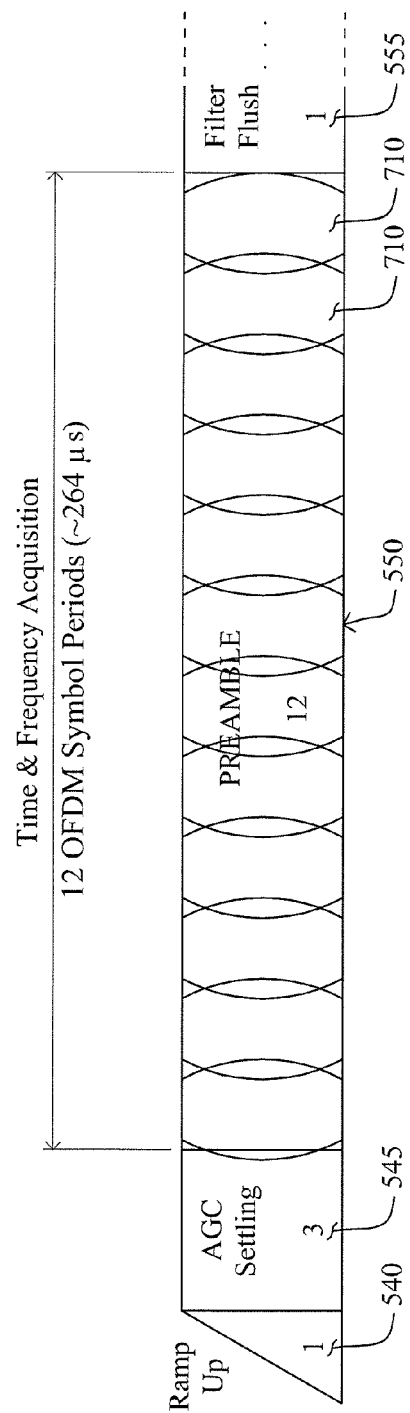
FIG. 7A illustrates a timing diagram for one example of a preamble segment of the packet of the FIG. 6.

Referring to FIG. 7A, there is illustrated one example of the packet preamble 550. In the illustrated example, the preamble 550 includes twelve non-repeating OFDM symbols 710 (which are windowed iFFTs, as discussed above). In one example, the use of twelve symbols 710 provides a sensitivity of about +1.7 dB; however it is to be appreciated that a different number of symbols may be used, for example, eight or ten symbols. The use of non-repeating symbols may provide added security and robust time synchronization; however, it is to be appreciated that the symbols may be repeated in some applications. In addition, in one example, the preamble is approximately 264 μs in length; however, it is to be appreciated that other lengths may be used. The twelve symbols 710 are used to acquire the time of arrival of the transmission at the receiver. The acquisition of the time of arrival may also be referred to as time synchronization. In one example, as described below, each symbol is individually correlated and then the correlations are summed to support successful time synchronization even where there may be a large frequency error. Time synchronization allows the receiver to compensate for such time offsets and to "reset" the waveform to defined starting point and obviate the need to maintain time synchronization between different transceivers in the network.

Figure 7B:
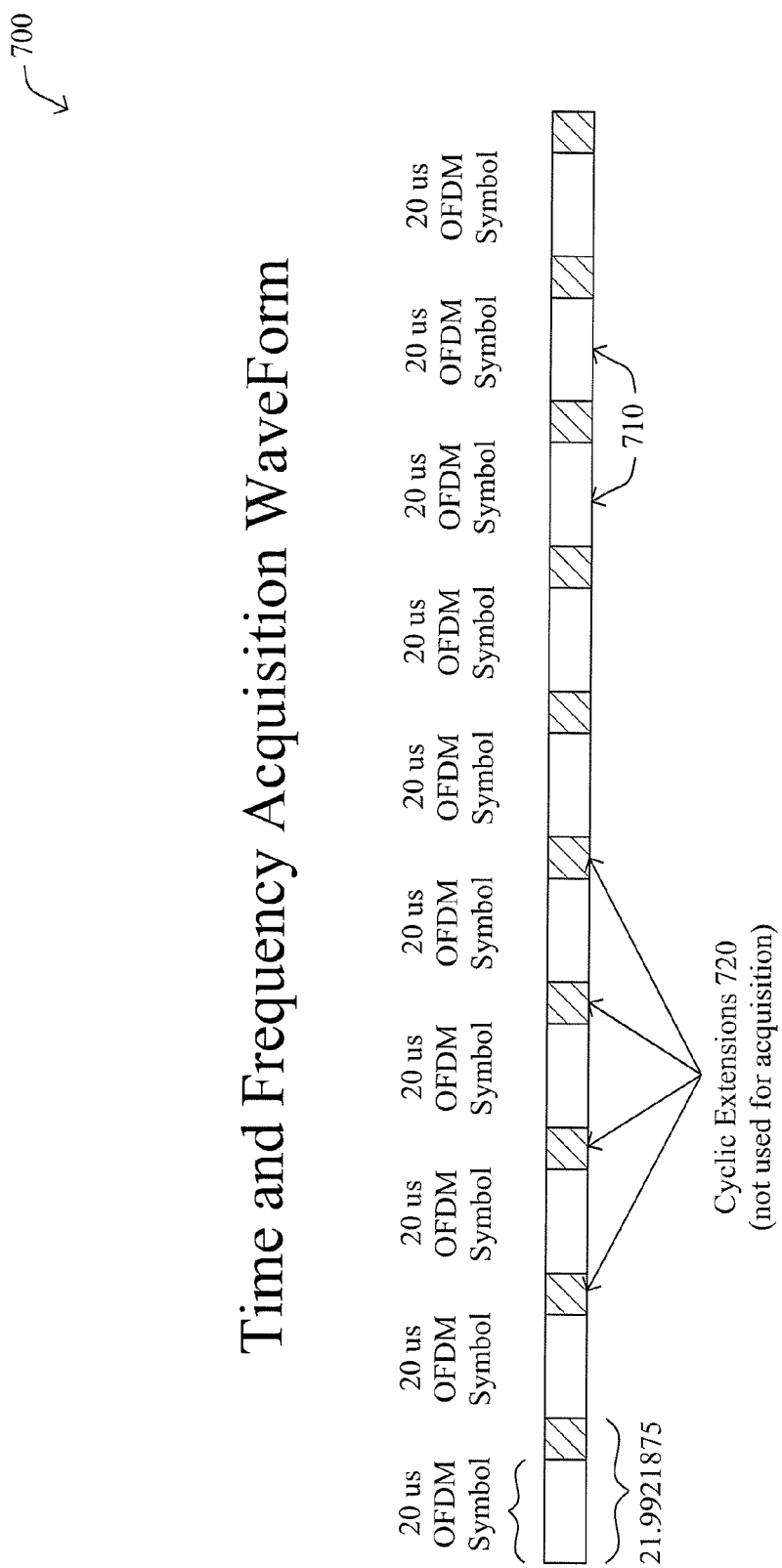
FIG. 7B illustrates another example preamble (acquisition sequence)

Notably, FIG. 7B illustrates an alternative representation of a preamble 550 (a time and frequency acquisition waveform), generally referred to as "700". As shown in FIG. 7B, ten symbols 710 may be used, each separated by a cyclic extension 720, which are not used for acquisition. Illustratively, each OFDM symbol 710 is 20 μs long, and with the addition of the cyclic extension 720 resulting in approximately 22 μs.

Figure 8:
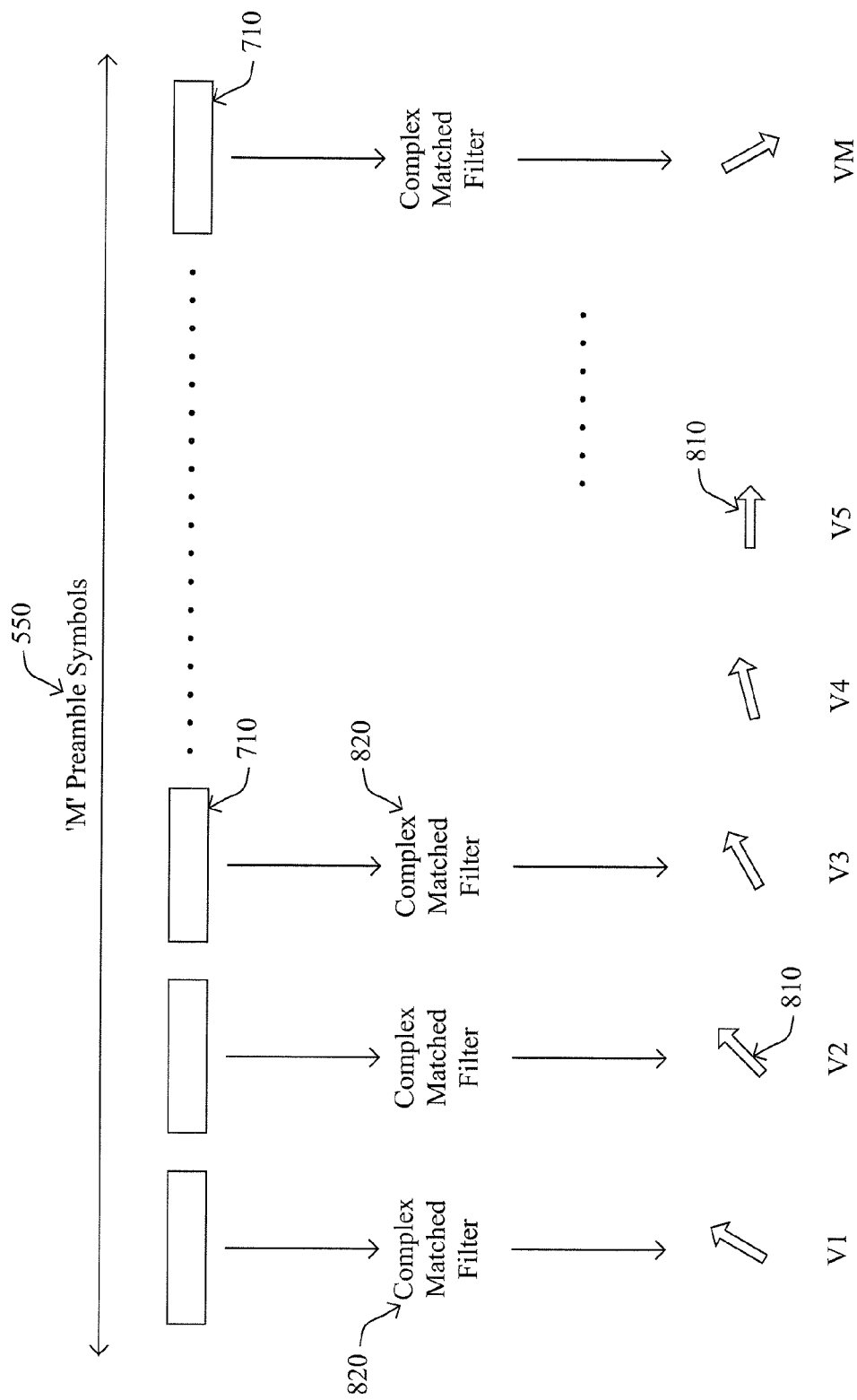
FIG. 8 illustrates a diagram of an example frequency acquisition process.

In one embodiment, the "m" non-repeating OFDM symbols 710 of the preamble 550 are also used to determine frequency error. As discussed above, frequency acquisition (or synchronization) may be performed following the time acquisition/synchronization process. In one embodiment, a corrected frequency estimate is computed for each symbol in the preamble 550. These frequency estimates may be computed on average rotation vectors 810 from each symbol to the adjacent symbol, as illustrated in FIG. 8. In one example, complex matched filters 820 are used to compute the frequency error based on the average rotation vectors 810 from symbol to adjacent symbol.

Simulations have demonstrated that the waveform allows for the time synchronization success rate (i.e., time synchronization successfully achieved) of 100%, or close to 100%, for positive signal-to-noise ratios (i.e., above 0 dB) in a channel with additive white Gaussian noise (AWGN). Additional simulations have shown that the time acquisition success rate in channels that have severe multipath effects, fading, interference, or other conditions not accounted for in an AWGN model channel, is still very good (e.g., generally over 90%) given a signal-to-noise ratio of at least 10 dB, and improves to close to 100% if the signal-to-noise ratio increases to 15 dB or above. Thus, a waveform with the preamble segment 550 discussed above allows robust, reliable communications between transceivers, even for links with less than ideal channel conditions.

Referring again to FIGS. 5 and 6, the filter flush segment 555 allows the receiver time to flush the filters after applying the frequency corrections discussed above and any automatic gain control hold. In one example, the filter flush segment 555 has a duration of approximately 22 μs and may contain one OFDM symbol, the content of which may be unimportant.

Figure 9:
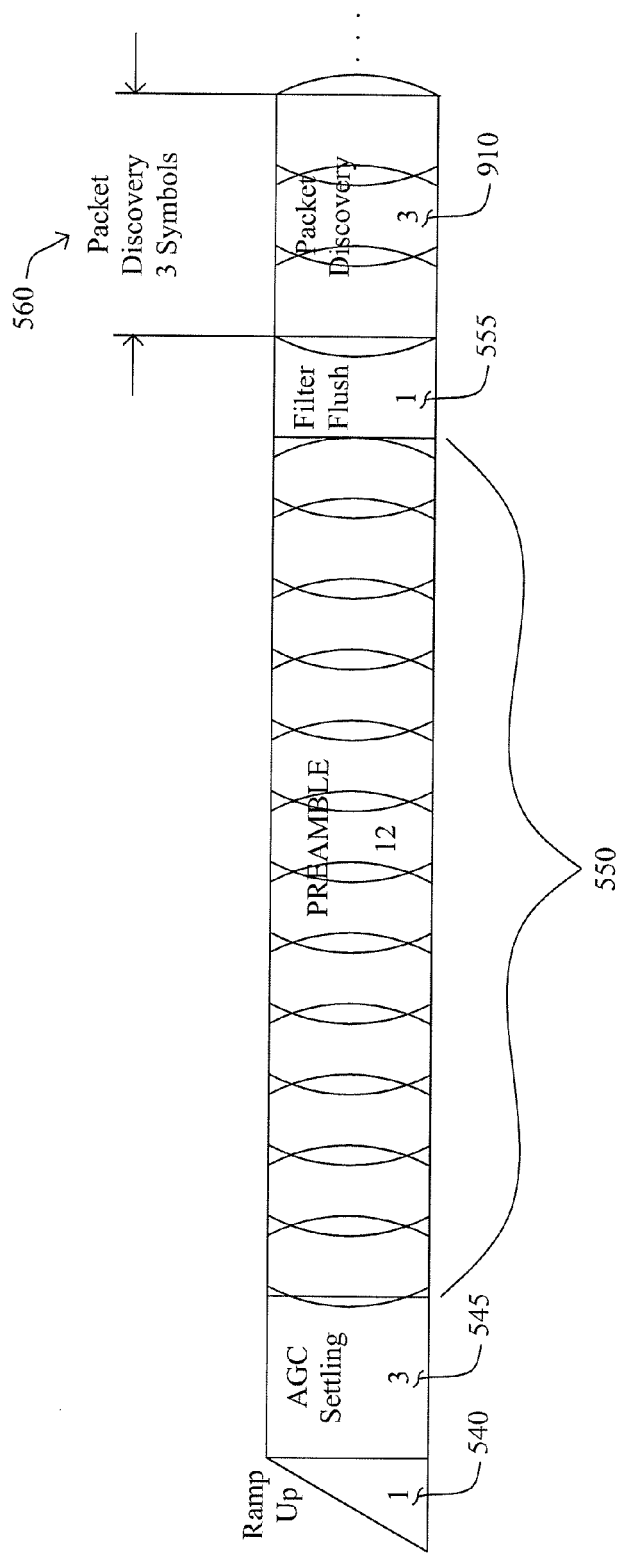
FIG. 9 illustrates a timing diagram for one example of a packet self discovery segment of the packet of the FIG. 6.

The packet 520 further comprises the packet self discovery segment 560 which contains OFDM symbols containing information needed for the receiver to demodulate the packet. In one example, the packet self discovery segment 560 is about 66 μs in duration. Referring to FIG. 9, according to one embodiment, the packet self discovery segment 560 includes three non-repeating OFDM symbols 910, which are windowed iFFTs as discussed above, which may provide twelve bits of information to the receiver. As discussed above, these twelve bits describe characteristics of the packet and in particular the payload (data segment 515) required for the receiver to demodulate the packet. This information includes, for example, the packet size (e.g., one, two or four slots), the modulation type used by the is transmitter (e.g., BPSK, QPSK, QAM, etc.), the number of channel segments, and the code rate for any forward error correction encoding that was implemented by the transmitter. In one embodiment, the information contained within the twelve bits of the packet self discovery segment 560 is unknown by the receiver until the packet self discovery segment is received and decoded, which allows the receiver to be adaptable to varying packet types and sizes since the demodulation information can be retrieved and implemented dynamically for each packet. Each symbol 910 in the packet self discovery segment 560 may provide four bits of information encoded as one of sixteen Walsh sequences modulated onto the twenty-one tone channel segment discussed above. For each symbol, the receiver selects the Walsh sequence with the maximum likelihood of success and decodes the four bits to obtain the demodulation information.

Figure 10:
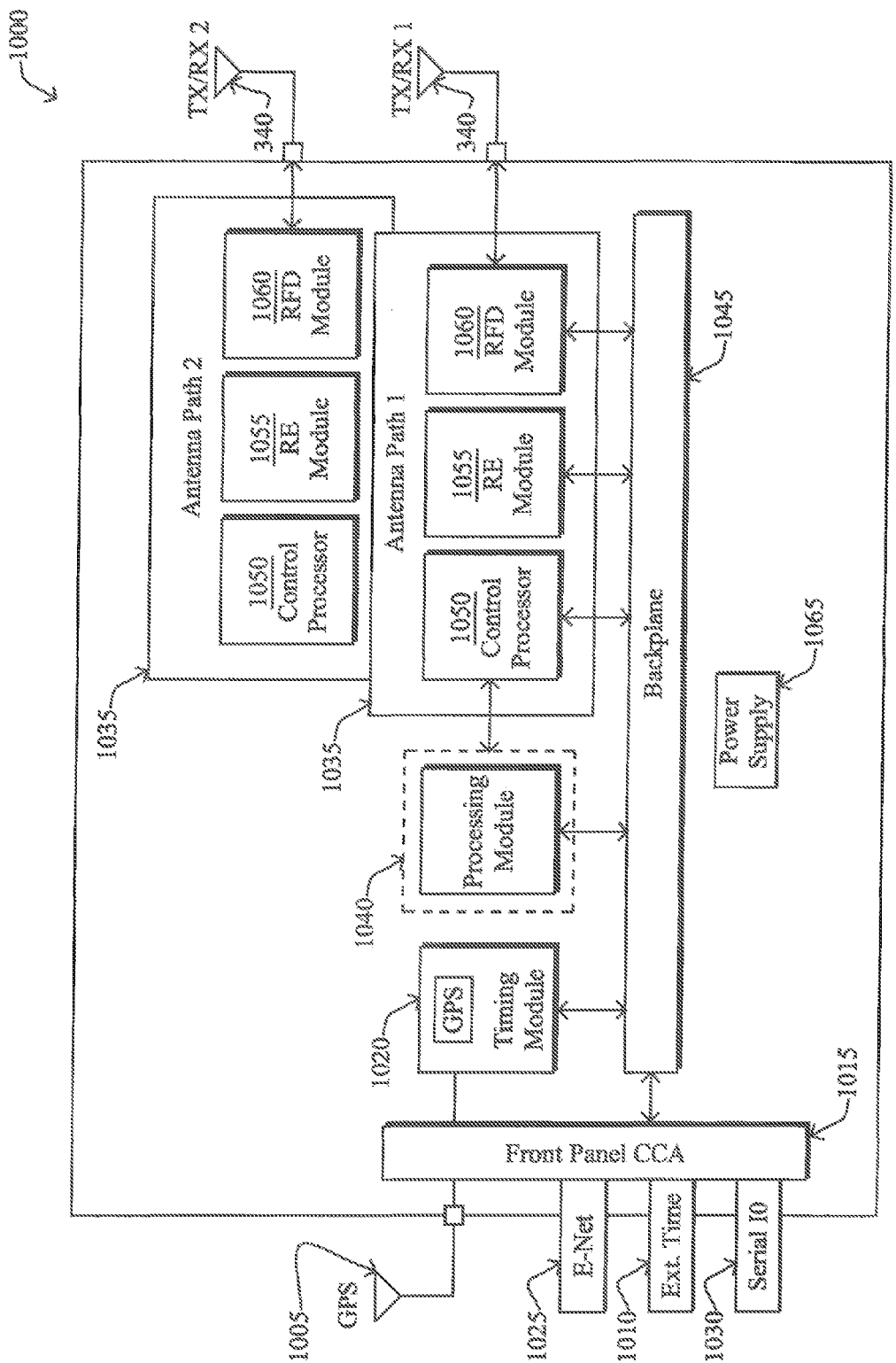
FIG. 10 illustrates a block diagram of one example of a radio transceiver (communication device)

Referring to FIG. 10, there is illustrated a block diagram of one example of a radio transceiver in which embodiments of the waveform discussed above may be implemented (e.g., as a transmitting device 110 and/or receiving device 120). In one embodiment, the radio transceiver 1000 is capable of multiple input multiple output (MIMO) operation and exploits time and space diversity through duplicative antennas and duplicative antenna paths to provide robust connectivity in severe fading environments, as discussed further below. FIG. 10 illustrates an example configuration for a 2T×2R (i.e., two transmitters and two receivers) MIMO system; however it is to be appreciated that any of the transceivers in the network may include one or more transmitters and one or more receivers, not limited to the 2×2 example shown in FIG. 10. In addition, the radio transceiver 1000 may be dynamically configurable between any of the above-mentioned configurations, for example, MIMO operation may be disabled (or enabled) via a user interface. The preamble 560 of the packet 520 may include a bit indicating MIMO operation if applicable.

As discussed above, according to one embodiment the radio transceiver may uses a GPS signal for timing and synchronization. Accordingly, the radio transceiver 1000 may include a GPS antenna 1005 to receive an external GPS signal, for example from a GPS satellite. Alternatively, the transceiver 1000 may include a timing input 1010 configured to accept a timing signal from an external source as an alternative to receiving a GPS signal. The timing/GPS signal may be provided, via a Front Panel Circuit Card Assembly (CCA) 1015 to a timing module 1020 where it is processed to provide timing information to synchronize the waveform to the channel slots, as discussed above. The timing module 1020 may also include a clock (not shown) that can continue to provide timing information to synchronize the waveform, e.g., in place of external timing/GPS or in the event of an external timing/GPS outage, as discussed above. In one example, the clock is sufficiently accurate, and the waveform includes a sufficient large clock offset segment 530 such that the transceiver can operate normally for up to 24 hours without access to the external timing signal.

The radio transceiver 1000 may further include an Ethernet port 1025 and a serial I/O port 1030 coupled to the Front Panel CCA 110. These ports may acts as interfaces through which data is communicated to the radio transceiver 1000 for transmission via antennas 340. The Front Panel CCA 1015 provides connectors and electronic components to accommodate the variety of electrical interfaces discussed above, and also may provide additional interfaces if needed.

Still referring to FIG. 10, in one embodiment, the radio transceiver 1000 may include a processing module 1040 that provides general computational services to support the interfaces of the radio transceiver 1000, and may also implement networking protocols for the network in which the radio transceiver is operating. For example, in one embodiment, the processing module 1040 implements a standard Internet Protocol (IP) network stack accessible through the Ethernet port 1025. In one example, the processing module 1040 is a general purpose computer. The timing module 1020 and processing module 1040 are coupled to the antenna path(s) 1035 via a signal backplane 1045. As discussed above, the example transceiver illustrated in FIG. 10 is 2×2 MIMO configuration and accordingly includes two first antenna paths 1035 each coupled to one of the antennas 340. Each antenna path 1035 includes a control processor module 1050, a Receiver/Exciter (RE) module 1055, and a Radio Frequency Distribution (RFD) module 1060. The radio transceiver 1000 further includes a power supply 1065 to provide operating power to the components of the transceiver. In one example, the power supply 1065 may convert power to voltages required by the various components of the transceiver 1000.

According to one embodiment, the control processor module 1050 may provide computing capability, additional to that provided by the processing module 1040, to directly support the physical layer of the waveform and to implement the computations required to transmit or receive the waveform. The control processor module 1050 may therefore include a digital signal processor (DSP) that receives and processes digital signals which are intended to be transmitted or which are received. For example, the control processor module 1050 may also perform the iFFT and FFT computations and cyclic extension discussed above to generate and decode the OFDM symbols in the waveform. Accordingly, in a transmitter path, the control processor module may incorporate the iFFT module 315 discussed above with reference to FIG. 3A, and in a receiver path, the control processor module 1050 may incorporate the FFT module 370 discussed above with reference to FIG. 3B. The control processor module may also implement forward error correction encoding and decoding of the waveform, and interleaving and de-interleaving of the bits of a packet, as well as transmission security features, as discussed further below. The control processor module 1050 may also implement modulation and demodulation of the data in the waveform. In addition, the control processor module 1050 may monitor the status of the radio transceiver 1000 and provide control of the RE module 1055. In one embodiment, the RE module 1055 provides analog signal processing (e.g., amplification, frequency translation, and filtering). Accordingly, in the transmitter path, the RE module 1055 may incorporate the up-conversion module 330 and the digital-to-analog converter 320 and in the receiver path, the down-conversion module 350 and analog-to-digital converter 360. The RFD module 1060 provides power amplification of RF signals for transmitting, Low Noise Amplification (LNA) for receiving, and switches the antenna between different electronic paths based on whether the radio is receiving or transmitting. Accordingly, in the transmitter path, the RFD module 1060 may incorporate the RF amplifier 335 and in the receiver path, the low noise amplifier 345. According to one embodiment, the antenna path(s) 1045 are implemented as one or more field programmable gate arrays (FPGAs), although those skilled in the art will recognize that other implementations can be used.

Notably, the communication device 1000 shown in FIG. 10 is merely one illustrative example arrangement. For instance the communication device 1000 may alternatively be configured as a software-based communication device. For example, a memory may comprise a plurality of storage locations that are addressable by one or more processor for storing software programs and data structures associated with the embodiments described herein. The processors may comprise necessary elements or logic adapted to execute the software programs and manipulate the data structures, and an operating system may functionally organize the device by, among other things, invoking operations in support of software processes and/or services executing on the device. In addition, software processes may contain computer executable instructions executed by the processor to perform functions related to the particular process.

As discussed above, the transceiver can be configured for transmit diversity (e.g., MIMO and/or MISO) operation in which the transceiver exploits time and space diversity through duplicative antennas 340 and duplicative antenna paths 1035 to provide robust connectivity in severe fading environments. According to one embodiment the transceiver employs space-time block coding to provide transmitter path diversity and to prevent interference between antennas 340. Space-time block coding which is a technique whereby multiple copies of a data stream are transmitted across a number of antennas and the various received versions of the data are combined to improve the reliability of data-transfer. In severe fading environments where the transmitted signal may be subject to scattering, reflection, refraction, etc., and may then be further corrupted by thermal noise in the receiver, some of the received copies of the data may be "better" than others (e.g., in urban areas or other locations with high multipath propagation conditions). Therefore, the built-in redundancy of transmitting and/or receiving multiple copies of the data results in a higher chance of being able to use one or more of the received copies to correctly decode the received signal. In one example, the transceiver may implement Alamouti space-time coding and decoding when multiple transmitters are active, as may be appreciated by those skilled in the art.

As also discussed above, wireless communication receivers must generally be synchronized in time and frequency with a particular received communication signal in order to be able to correctly parse the particular signal from other signals or noise throughout the radio frequency (RF) spectrum. Accordingly, the preamble 550 or "acquisition sequence" 700 may be transmitted from a transmitting device such that any interested receiver may detect the transmission and synchronize to it. However, receivers in a transmit diversity scheme (e.g., MIMO or MISO) generally need to acquire each of the multiple transmitters separately in order to understand the overlapping transmitted signals. That is, the receivers are unable to de-conflict/recover the multiple signals until synchronizing to each of the separate transmitters.

One problem associated with simply transmitting an acquisition sequence (preamble) is that, unlike single antenna transmission, transmit diversity systems transmitting the synchronization signals from multiple antennas would result in those signals being superposed on each receive antenna, and thus they would generally interfere with one another. Various solutions have been utilized to allow receivers in a transmit diversity architecture to acquire (synchronize to) the multiple transmitters, but each has had its own drawbacks. For example, as noted above, the synchronization structure may be transmitted from only a single antenna, such that receivers may use a single correlator to detect the structure. This approach, however, provides no diversity benefit, possibly allowing for the synchronization structure to be lost (e.g., faded), and also wastes the power from one or more transmitters. In another approach, a first antenna may transmit the sequence, and when complete, a second antenna may transmit a sequence, etc., such that each antenna's (transmitter's) sequence does not overlap with another antenna's. This, unfortunately, multiplies the time required to acquire each antenna with the number of antennas, thus doubling for two antennas, tripling for three antennas, etc. Alternative approaches require computationally expensive algorithms, such as transmitting distinct pseudonoise structures from each antenna, and using multiple correlators to detect the superposed structures. This computationally expensive approach allows the synchronization structures to interfere, but incurs a resulting performance degradation. Also, an even more computationally expensive approach involves transmitting orthogonal synchronization structures from multiple antennas, such as orthogonal acquisition waveforms for orthogonal frequency division multiplexing (OFDM), and using multiple correlators (e.g., 16×16 complex correlators) to detect the structures. This approach, while providing superior performance, is the most computationally expensive approach.

Acquiring a signal (receiver synchronization) has thus been the weakest link for transmit diversity technologies, particularly without providing acquisition (synchronization) processing circuitry that is vastly more complex than the circuitry required to demodulate the synchronized data signal itself.

Receiver Synchronization for Transmit Diversity

According to one or more embodiments described herein, therefore, multiple transmitters may simultaneously transmit orthogonal acquisition sequences that are separable by receivers, such as by zeroing out certain frequencies. Specifically, as described in more detail below, a transmitting device 110 may divide a plurality of radio frequency (RF) tones into a plurality of distinct subsets, and assigns a particular subset of tones to each of a plurality of transmitters, e.g., for each symbol in an orthogonal acquisition sequence for the plurality of tones. When generating the orthogonal acquisition sequence for each of the one or more of the plurality of transmitters, the transmitting device may set tones that are not part of the assigned subset for a corresponding transmitter to zero for each symbol of the corresponding acquisition sequence of that corresponding transmitter, and then the sequences may be simultaneously transmitted from each of the one or more of the plurality of transmitters. In addition, as described in more detail below, a receiving device 120 may receive a signal at a particular receiver/antenna, and filters the signal, e.g., through one or more delay and combine filters, to produce a plurality of filtered signals that distinguish orthogonal acquisition sequence symbols based on which one or more subsets of tones are zeroed out within the symbols. As such, the receiver may detect an orthogonal acquisition sequence within one of the filtered signals, and may correlating that to a particular transmitter of the transmitting device for synchronization with that particular transmitter.

Illustratively, the techniques described herein may be performed by hardware, software, and/or firmware, depending upon the configuration of the communication device 1000, as noted above. For instance, the processing of the transmitted signals and received signals may be performed by processing module 1040 and/or control processor(s) 1050, with additional hardware, software, and/or firmware in place to perform the techniques herein (e.g., various filters, as described below). Specifically, the communication devices 1000 may be configured to allow synchronization through transmitting from a plurality of transmitters at the same time, even though the receivers are not yet able to de-conflict/recover the overlapping signals, as described herein. In this manner, the techniques in accordance with one or more embodiments of the invention provide a transmit diversity synchronization techniques that is as powerful as the transmit diversity (MIMO/MISO) data communication itself, maintaining the robustness of the preamble communication in various environments (e.g., fading channels), without requiring complex circuitry or processing.

Figure 11:
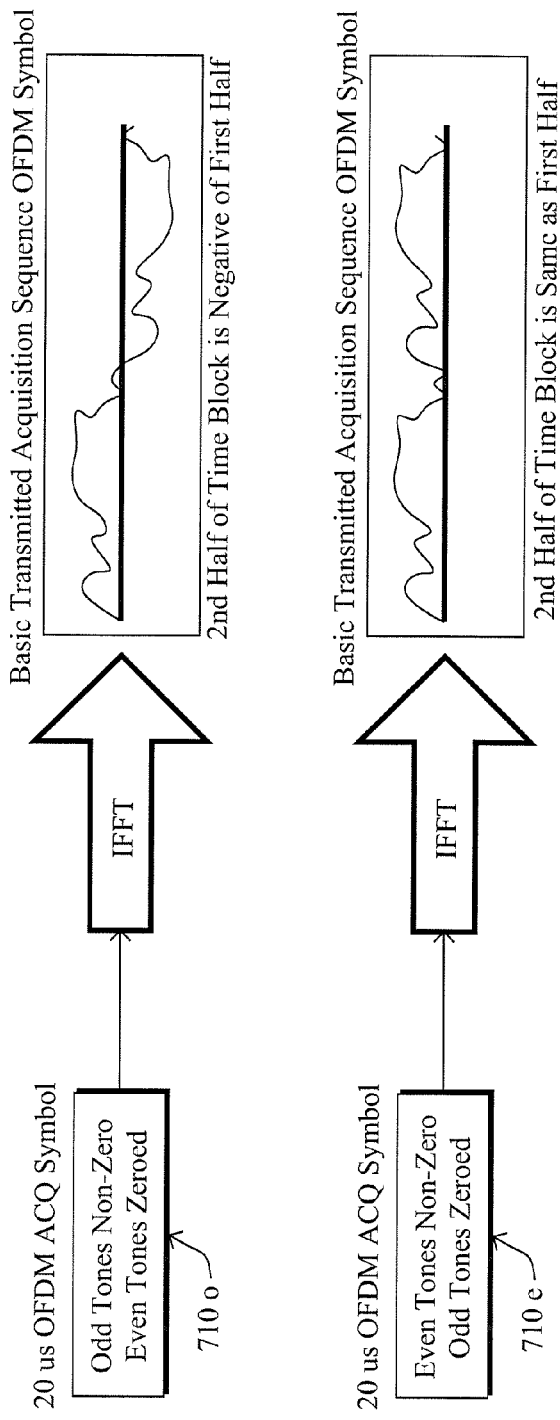
FIG. 11 illustrates an example pair of distinguishable acquisition symbols.

Operationally, one or more embodiments of the invention rely on the ability of the transmitting device to generate orthogonal acquisition sequences 700 for each transmitter/antenna that can be readily distinguished by the receivers. Specifically, in a preferred embodiment, this distinguishing feature is based on properties of OFDM symbols generated by IFFTs when certain tones of the symbol are zeroed out. For instance, as illustrated in FIG. 11, when there are two transmitters, a simple example for purposes of illustration, an OFDM symbol "710o" with all the even tones set to zero, hence being an "odd symbol," the last half of the symbol is the negative/inverse of the first half. Conversely, for an OFDM symbol "710e" with all the odd tones set to zero, i.e., an "even symbol," the last half of the symbol is a repeat of the first half Note that the use of the terms "odd" and "even" are not meant to imply that the frequency value ends in an even or odd number, but instead refer to the first, third, fifth, etc., tones of a segment 210 or the second, fourth, sixth, etc., tones. For example, for tones separated by 50 kHz in a bandwidth segment 210 starting at 100.00 MHz, the odd tones may comprise 100.00 MHz, 100.10 MHz, 100.20 MHz, etc., while even tones may comprise 100.05 MHz, 100.15 MHz, 100.25 MHz, etc. Also note that while the symbol halves are shown as purely positive or purely negative, this is for illustration only, and is not meant to limit the scope of the invention (i.e., a symbol may be have both positive and negative signals).

According to one or more of the embodiments herein, therefore, an orthogonal signal set (e.g., pair) may be constructed with a discrete Fourier transform (and therefore particularly suited to systems using OFDM), where, in one example, one signal of the pair is constructed by initializing a subset of even frequencies with pseudonoise and others with zero, and the other signal of the pair is constructed by initializing a subset of odd frequencies with pseudonoise and others with zero. The resulting signals comprise orthogonal pseudonoise vectors that receiver(s) may efficiently isolate for correlation due to the resulting symmetry properties, e.g., using simple 2 tap finite impulse response (FIR) filters.

Figure 12:
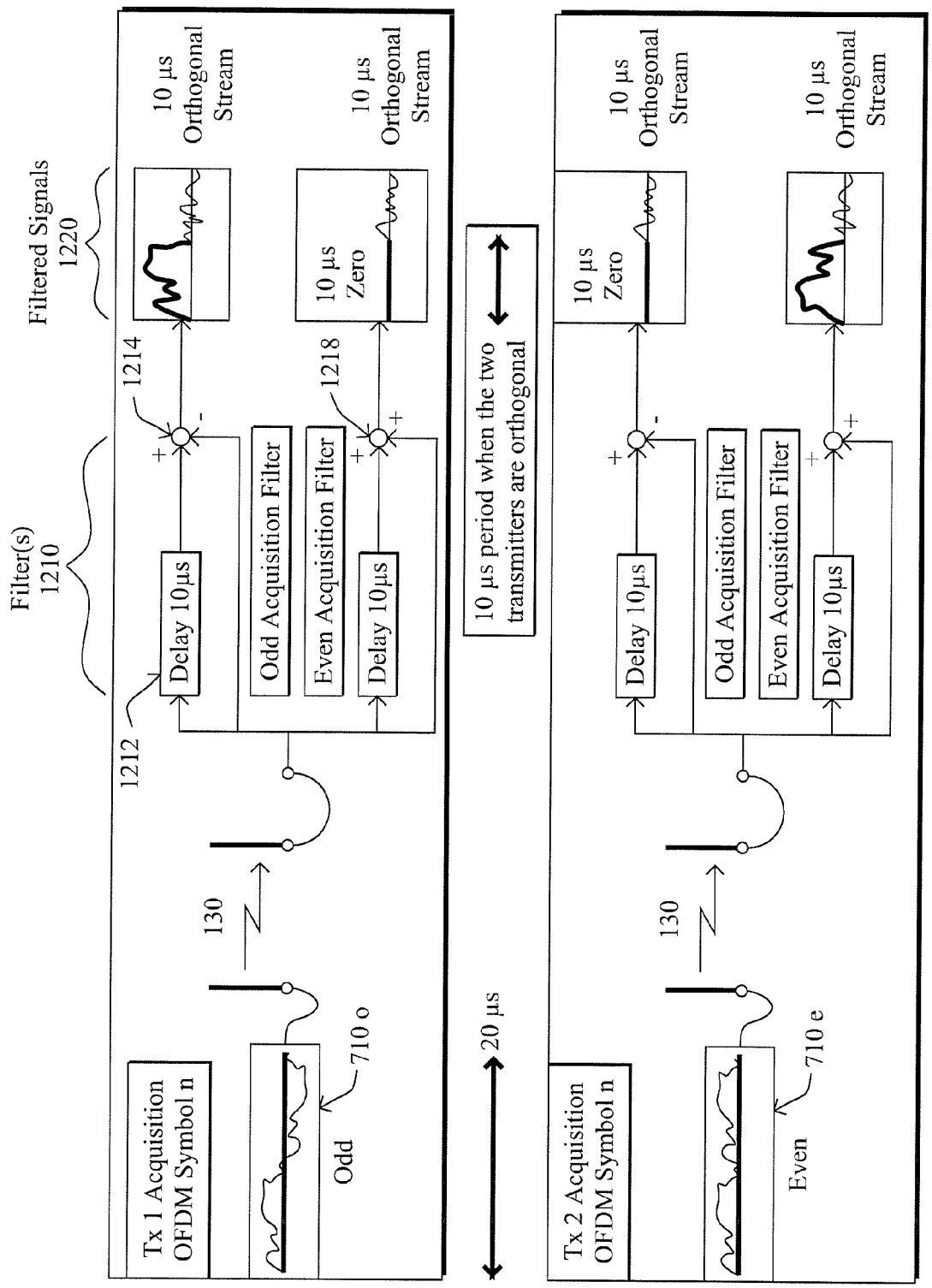
FIG. 12 illustrates an example communication and filtering of distinguishable acquisition symbols.

Specifically, orthogonality of the symbols (for two transmitters) exists only for 10 μs for each 20 μs transmitted OFDM symbol, and acquisition is based on correlating to these 10 μs orthogonal periods. FIG. 12 illustrates an example arrangement of filters 1210, illustratively comprising a delay and add (or subtract) configuration. For instance, two delay circuits 1212 and 1216 may feed the signal into two distinct paths, the top path for filtering to obtain symbols with only odd tones, and the bottom to obtain symbols generated with only even tones. In particular, the delay for two transmitters is half the length of the symbol (e.g., ½ of 20 μs is 10 μs) to produce a delayed signal. To filter for (obtain) odd-toned symbols, the second half of the received signal is subtracted from the first (delayed) half at junction 514, wile to filter for symbols transmitted on even tones, the two halves are added in junction 518. As shown in FIG. 12, therefore, when receiving an odd symbol 710o (top of figure), the odd acquisition filter produces an acquisition symbol (filtered signal 1220), while the even acquisition filter produces a cancelled signal. On the other hand, when receiving an even symbol 710e (bottom or figure), the odd acquisition filter now produces a cancelled signal, while the even filter produces a corresponding acquisition symbol. (Note that the produced acquisition symbol has doubled magnitude, and the processing of this double-magnitude is described below).

Figure 13:
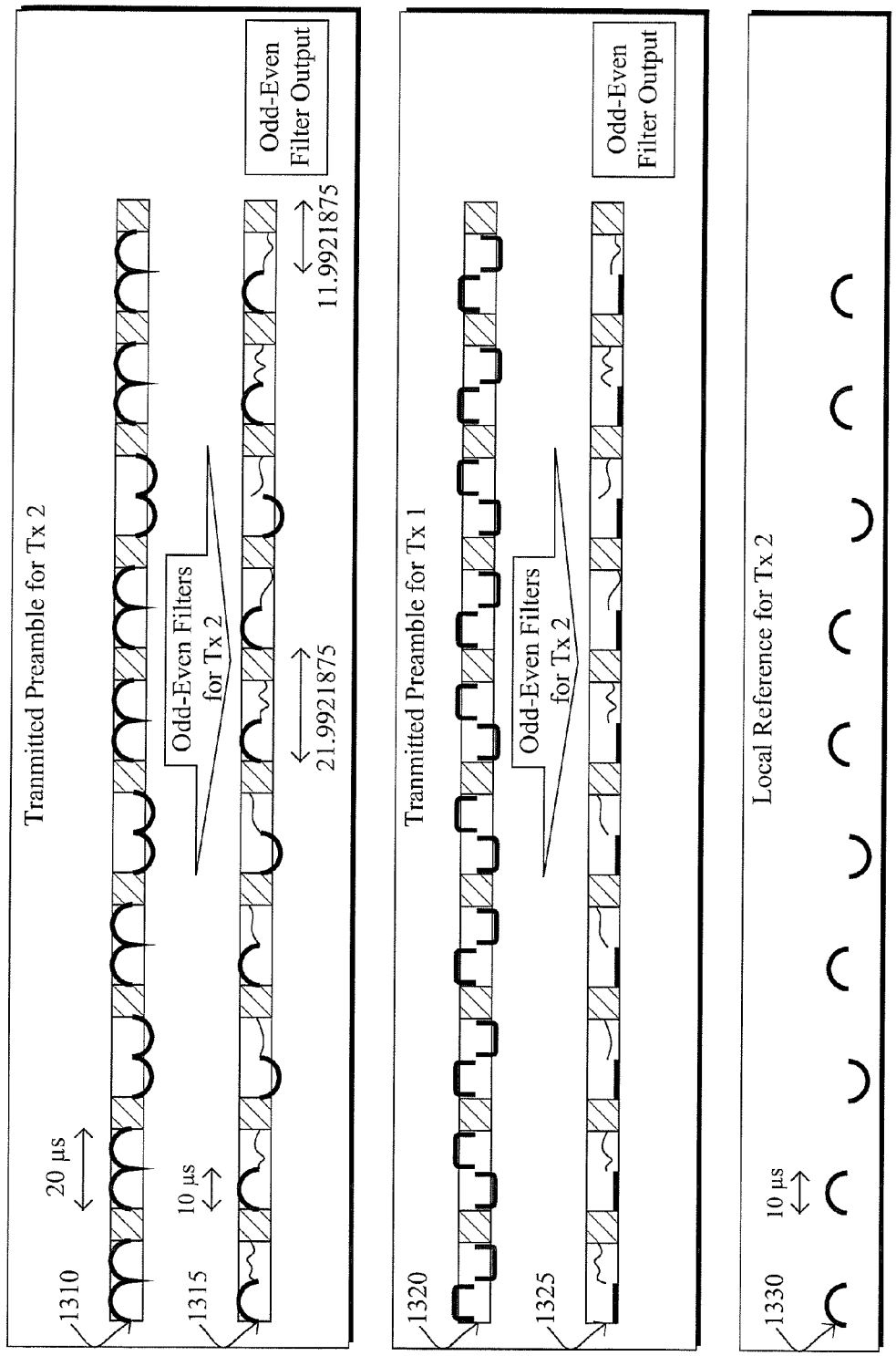
FIG. 13 illustrates an example filtering of an acquisition sequence.

FIG. 13 illustrates the transmission of entire acquisition sequences having a plurality of symbols. For instance, in one embodiment, Tx1's acquisition sequence is constructed from ten OFDM symbols, each symbol having all even tones set to zero (hence, all Tx1 symbols are odd), and Tx2's acquisition sequence is constructed from ten OFDM symbols, where each symbol has all odd tones set to zero (hence, all Tx2 symbols are even). As shown in FIG. 13, when applying the odd-even filters for Tx2 (to obtain even symbols) to Tx2's preamble 1310, the filter output 1315 results in the first half of the symbols transmitted from Tx2. At the same time, however, the simultaneous transmission of Tx1's acquisition sequence 1320 is also filtered, and the output 1325 when searching for Tx2's sequence results in cancellation of Tx1's symbol. Accordingly, when synchronizing to Tx2, the local reference 1330 may be used. Though not shown, when filtering the two signals 1310 and 1320 to detect an acquisition sequence on odd tones (even tones zeroed out) for Tx1, the signal from Tx2 is cancelled, while Tx1's output reveals the desired acquisition sequence. In this manner, the transmitters have created readily separable (distinguishable) orthogonal acquisition sequences for each of its transmitters that may be simultaneously transmitted without damaging interference and without requiring substantial processing on the part of the receivers.

Notably, where certain frequencies are zeroed out, such as transmitting on only half of the tones/frequencies, then the transmitters are able to transmit on the non-zeroed-out tones/frequencies at increased power levels, e.g., twice the power. In particular, where the transmitters are each configured with a total transmission power X, e.g., 1 watt, then conventionally each tone of a Y (e.g., 20) tone symbol could receive X/Y watts (e.g., 1/20 watts). However, now that the number of tones is decreased (e.g., 10), then each of the tones would receive increased power (e.g., 1/10 watts). In other words, the corresponding acquisition sequences may be transmitted from transmitters with substantially total transmission power such that power normally allotted to zeroed out tones is applied to the assigned subset of tones for that corresponding acquisition sequence. This may also allow a receiver to synchronize to the transmitter(s) in fewer, though stronger, acquisition symbols.

Figure 14:
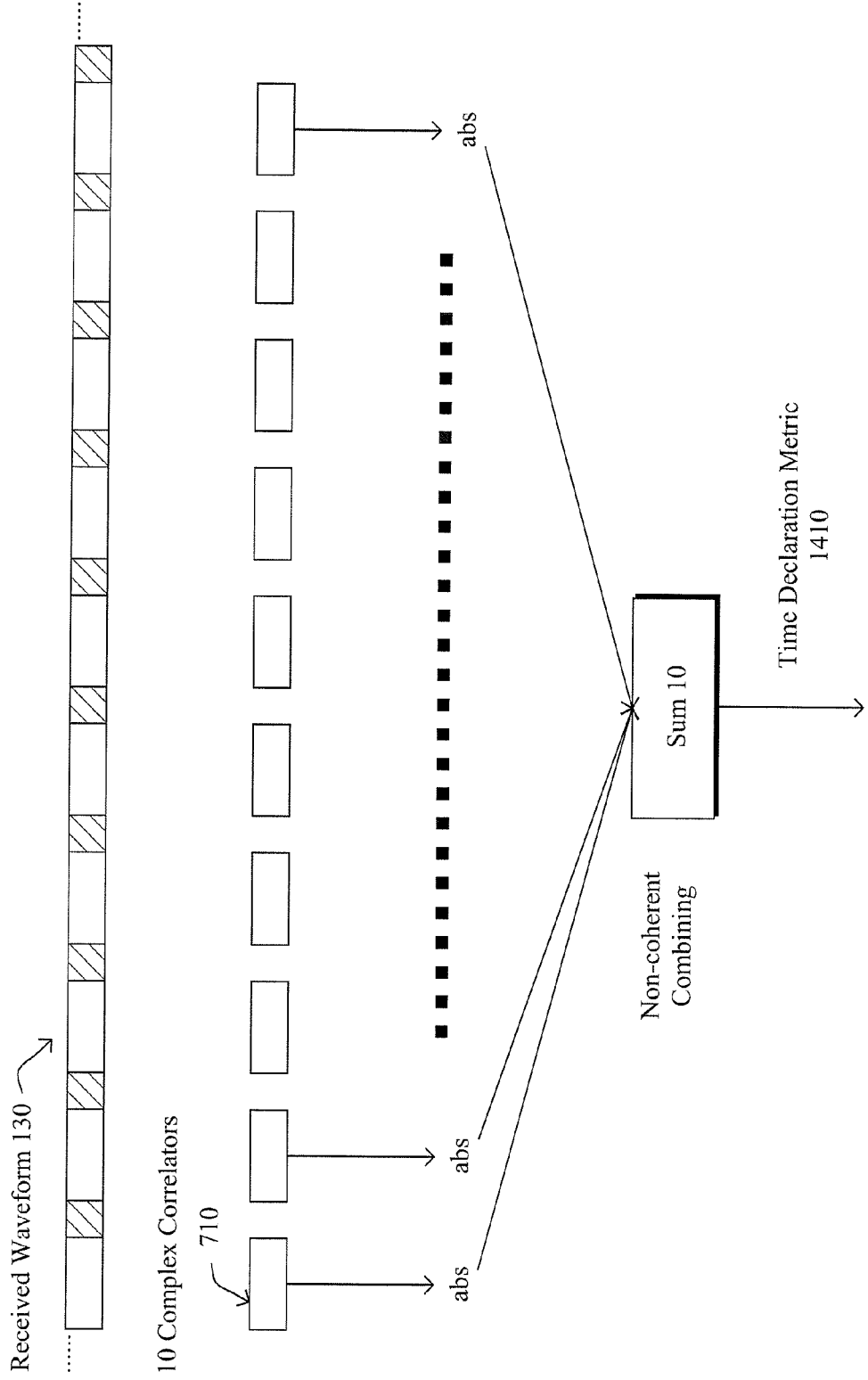
FIG. 14 illustrates an example simplification of acquisition sequence processing.

In addition to the core concepts mentioned above, certain processing simplifications may also be configured at the receivers in order to alleviate some of the processing burden generally associated with acquisition and synchronization. For instance, in one such simplification, when a plurality of symbols 710 are received within the orthogonal acquisition sequence 700, each symbol may be processed separately, and then the results cumulated to synchronize a particular receiver with a particular transmitter. For example, FIG. 14 illustrates how the received waveform (signal 130) may be divided or "broken up" into the individual synchronization symbols 710 (without the cyclic extensions) for separate processing by a corresponding complex correlator. Since the time correlation is illustratively performed over a ten OFDM symbol acquisition, the rotation over each OFDM symbol may be within a large range (e.g., 80-800 degrees). As such, coherent correlation is not advisable is over multiple OFDM symbols. Accordingly, a time declaration metric 1410 may be computed by correlating over the individual OFDM symbols, and then combining the multiple correlations non-coherently. Though a certain level of performance (dB) is given up with this model, significant gains are made with reduced complexity processing.

A further simplification may be achieved through correlation with the orthogonal components being performed with low precision arithmetic. For instance, signals are generally complex (non-binary), and may be sampled with, e.g., a 14-bit A-D converter. Having an illustrative 50 million samples/second, with 14 bit samples, results in a very high processing burden. In other words, even though the signals may be separated, they are still very wide band, thus creating a big (costly) processing problem. According to this simplification, then, the 14-bit samples may be reduced to one bit per sample (again trading about a dB of performance for processing simplification). For example, using a 1 bit correlator that limits the signal and reference I and Q to +1 or −1 (just the sign bit representation) drastically reduces the complexity and the required implementation resources. Such a non-linearity (reducing to sign bit) before correlation, however, creates intermodulation frequency components of the received signals+noise degrading the orthogonality. A solution, then, is to separate the signals before the non-linearity and then apply the non-linearity and reduced complexity correlation independently to each separate sample stream.

Figure 15:
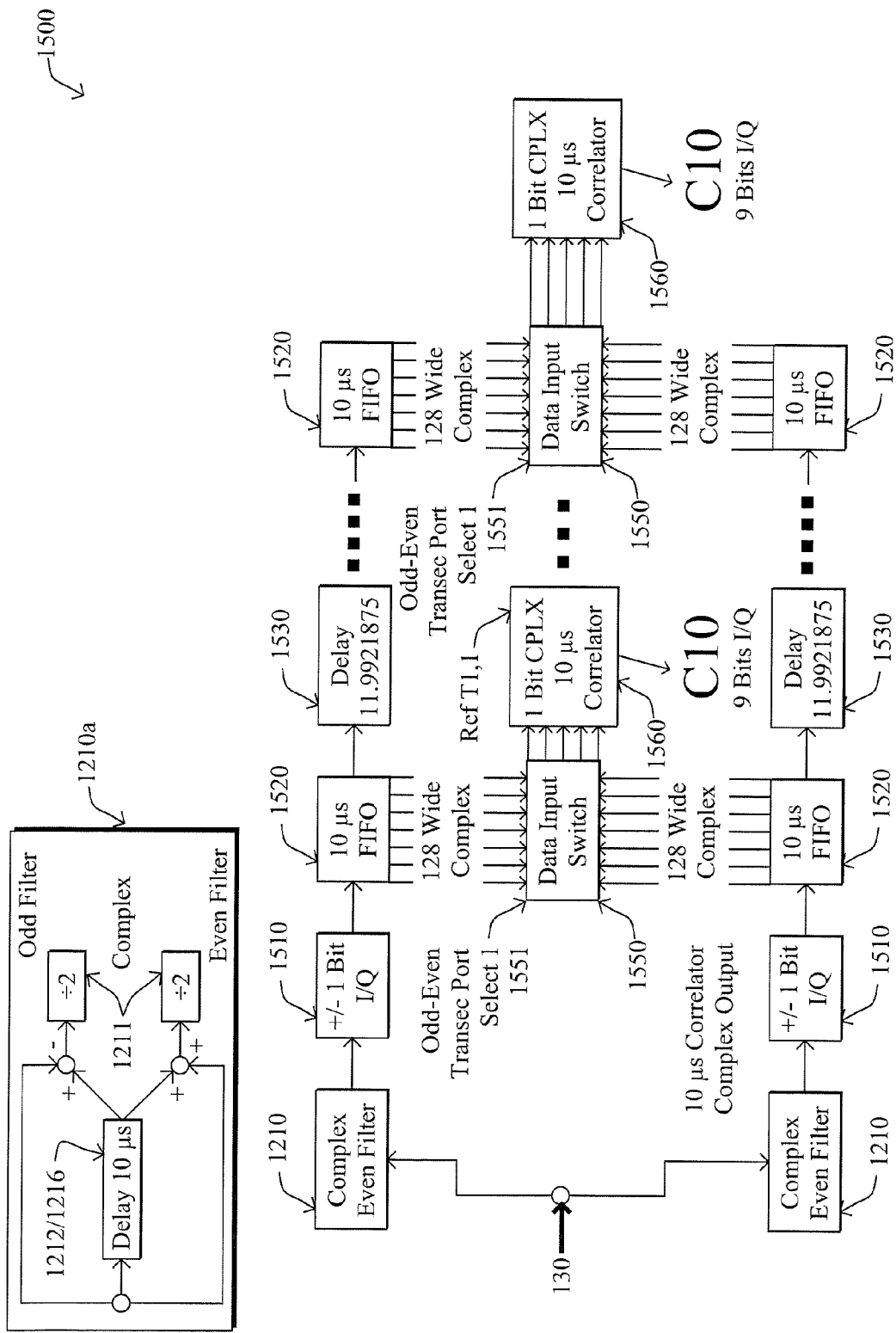
FIG. 15 illustrates an example block diagram implementation of acquisition sequence processing.
Figure 16A:
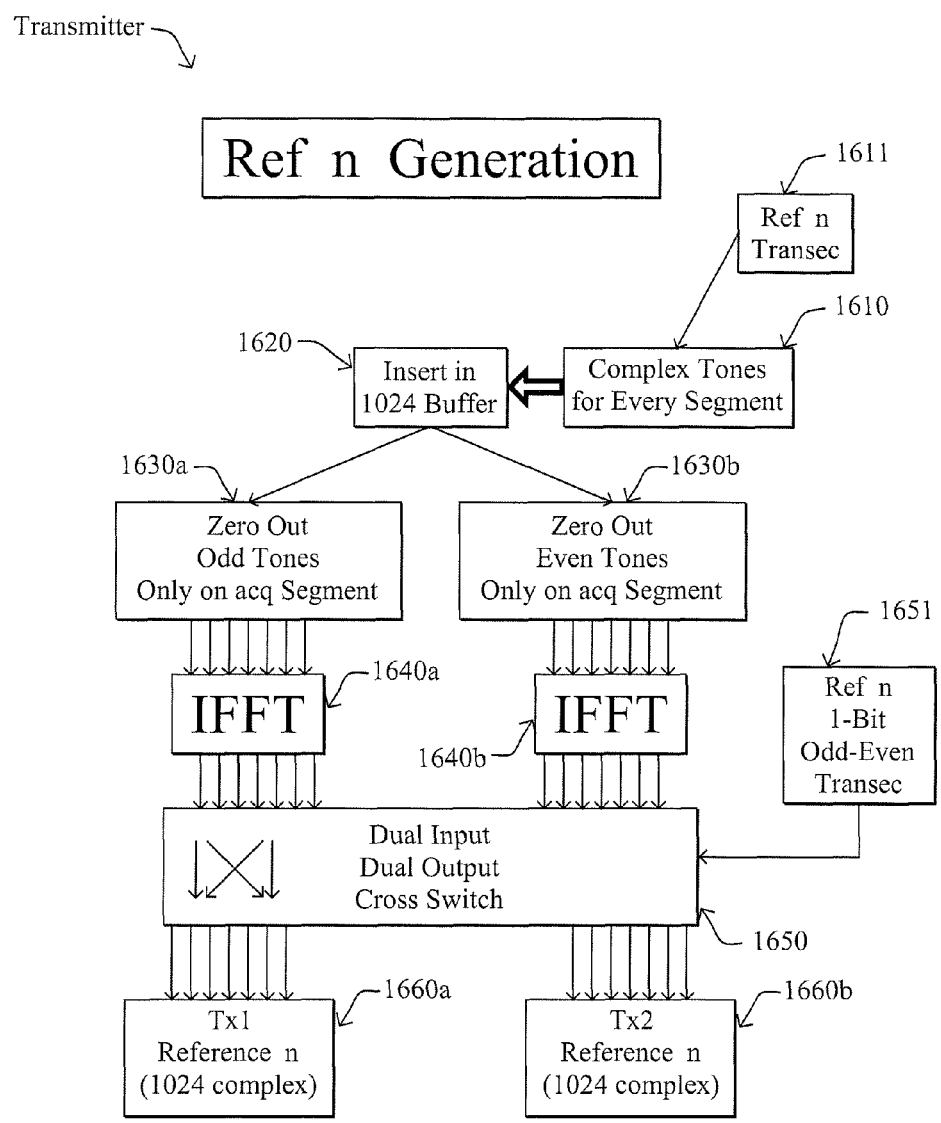
FIGS. 16A-B illustrate example block diagram implementations of reference symbol generation for transmitters and receivers, respectively.

FIGS. 15 and 16A+B illustrate example hardware implementations of certain aspects of the invention. For instance, FIG. 15 illustrates an example hardware implementation 1500 of filtering and processing (correlation) of incoming signals 130 in accordance with one or more embodiments herein. For instance, the received signal may be divided to the two (or more) complex filters 1210. Note that an alternative filter arrangement 1210a is shown with a combined delay circuit 1212/1216 feeding the two junctions. Note also that due to the to doubling of the desired symbols from the junctions, a division circuit 1211 may be included to reduce the magnitude of the symbol for processing, assuming, that is, that the symbols are not reduced simply to their sign bit representations, as mentioned above (at which time, the division would be unnecessary).

Once the signal has been filtered, it may be forwarded to a 1-bit correlator 1510 to simplify the signal to its sign bits, and then the signal may enter a 10 µs queue/buffer (first-in-first-out, or FIFO) 1520 to begin separation of the individual symbols 710 for individualized processing. Specifically, an illustrative 128 wide complex of the symbol may optionally enter a data input switch 1550 (controlled by transec bits 1551 described below), and then (or else directly) into a 1-bit complex 10 µs correlator 1560 to produce a correlation result (e.g., "C1" for the first symbol, up to "C10" for a ten-symbol sequence). Note that a delay circuit 1530 may be used to separate the symbols (half a symbol length plus an illustrative cyclic extension), prior to entering the next buffer/queue 1520, accordingly.

Figure 16B:
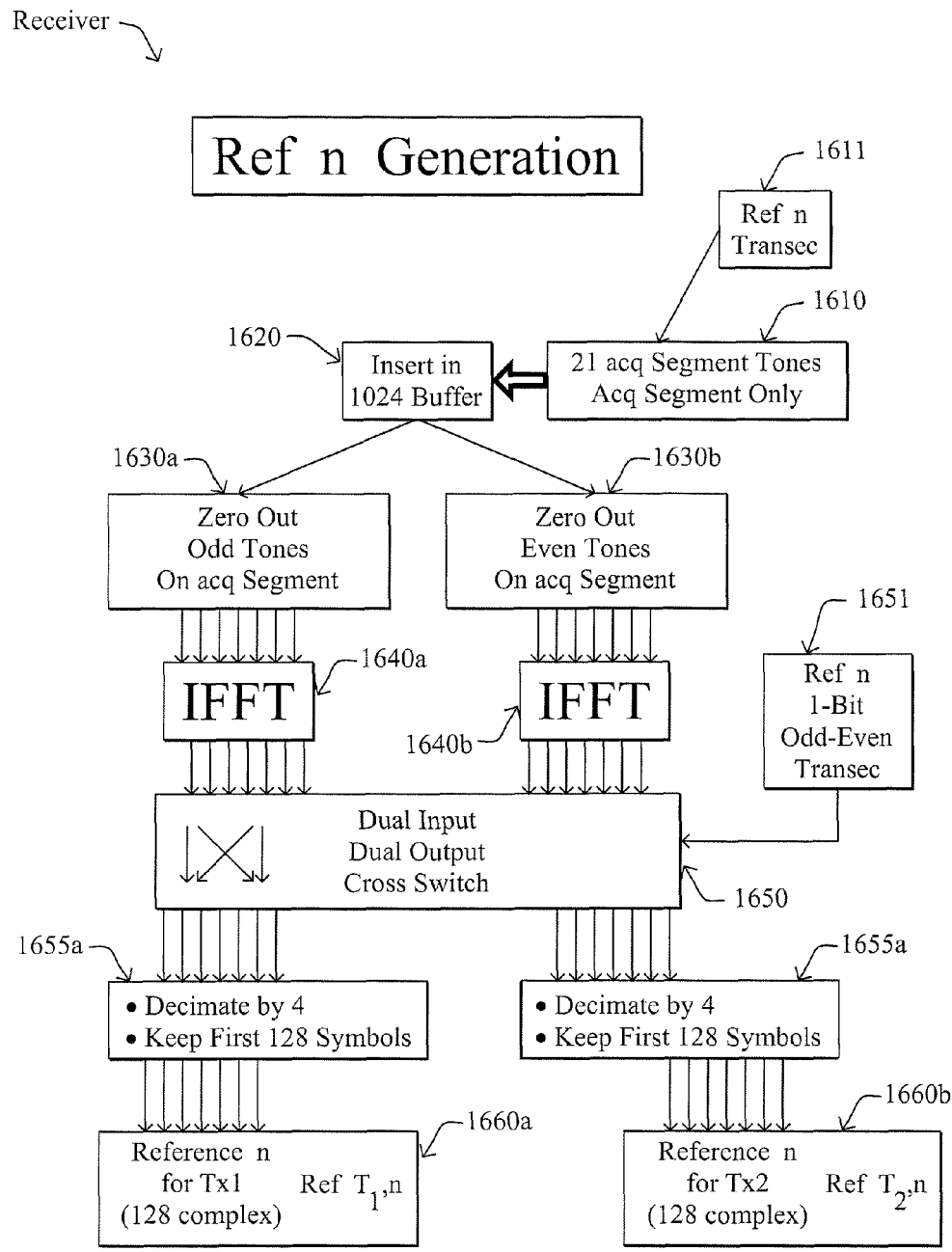

FIGS. 16A+B illustrate example circuitry for use with generating the reference symbols (reference symbol "n" within a ten symbol sequence), with FIG. 16A illustrating the transmitter's generation, and FIG. 16B illustrating the receiver's generation. In FIG. 16A, complex tones 1610 for every segment may be inserted into a 1024 buffer 1620, which may then branch out to two zeroing out circuits 1630a and 1630b. Circuit 1630a illustratively zeroes out odd tones on only acquisition segments, and circuit 1630b zeroes out even tones on only acquisition segments (with non-acquisition segments passing through both without being zeroed out). IFFTs 1640a/b may then be performed on the segments, and through dual input dual output cross switch 1650, may be directed to a particular transmitter (Tx1 or Tx2) as a 1024 complex reference 1660a/b. Illustratively, the odd segments or even segments may always be directed to the same transmitter, and hence cross switch 1650 may not be required, though, as described below, a transec input bit 1651 may be used to scramble a preamble's segments through the cross switch. FIG. 16B is similar in structure, through only acquisition segments tones 1610 are input into the buffer 1620. Also, an additional decimation circuit 1655 may decimate the segments by 4, keeping the first 128 symbols to result in a 128 complex as the reference 1660 for each transmitter, as may be appreciated by those skilled in the art.

As discussed above, in one embodiment, the waveform may incorporate various transmission security ("transec") features. For example, the transmitter path may include a transmission security encoder that uses pseudorandom sequences to add transmission security to the packets. In one example, each of the OFDM tones in assigned channel segments may is be encoded with a transmission security feature, referred to as security covering, prior to the IFFT mapping from the frequency domain to time domain discussed above. In one example, security covering includes the mapping of each symbol to a new symbol based on a complex security bit generated as part of a pseudorandom sequence (reference in FIGS. 16A+B as an input 1611 to the tones 1610). In one embodiment, all of the packet segments including the "filler" segments discussed above, may be security covered, such as, e.g., according to an Advanced Encryption Standard (AES)-256 based, National Institute of Standards and Technology (NIST) approved, security generator. For example, the AES generator may utilize a 256-bit key along with a 64-bit seed sequence to generate the pseudorandom sequence of the security cover bits, where the seed sequence may be generated based on a combination of information, e.g., time of day, calendar date, etc., and various network identification parameters. (Note that the receiver path also includes a complementary security decoder).

Alternatively or in addition, for transmission security, the assignment of tone subsets to a particular transmitter may be changed between transmissions, or, more particularly, may be changed for each symbol. That is, rather than assigning the same subset of tones to a particular transmitter for each symbol in the corresponding orthogonal acquisition sequence for that transmitter (as in FIG. 13 above), the transec augmentation may assign a different subset of tones to a particular transmitter for one or more symbols in the corresponding orthogonal acquisition sequence for that transmitter. For example, assume in a two-transmitter system, that Tx1 has an acquisition sequence 700 that is constructed of ten OFDM symbols, where each symbol has either all even tones set to zero or all odd tones set to zero. In this instance, the other transmitter Tx2 may have an acquisition sequence 700 that is also constructed from ten OFDM symbols, where each symbol has all odd tones set to zero if the same symbol of Tx1 has all even tones set to zero, or else all even tones are set to zero to if the same symbol of Tx1 has all odd tones set to zero.

Figure 17:
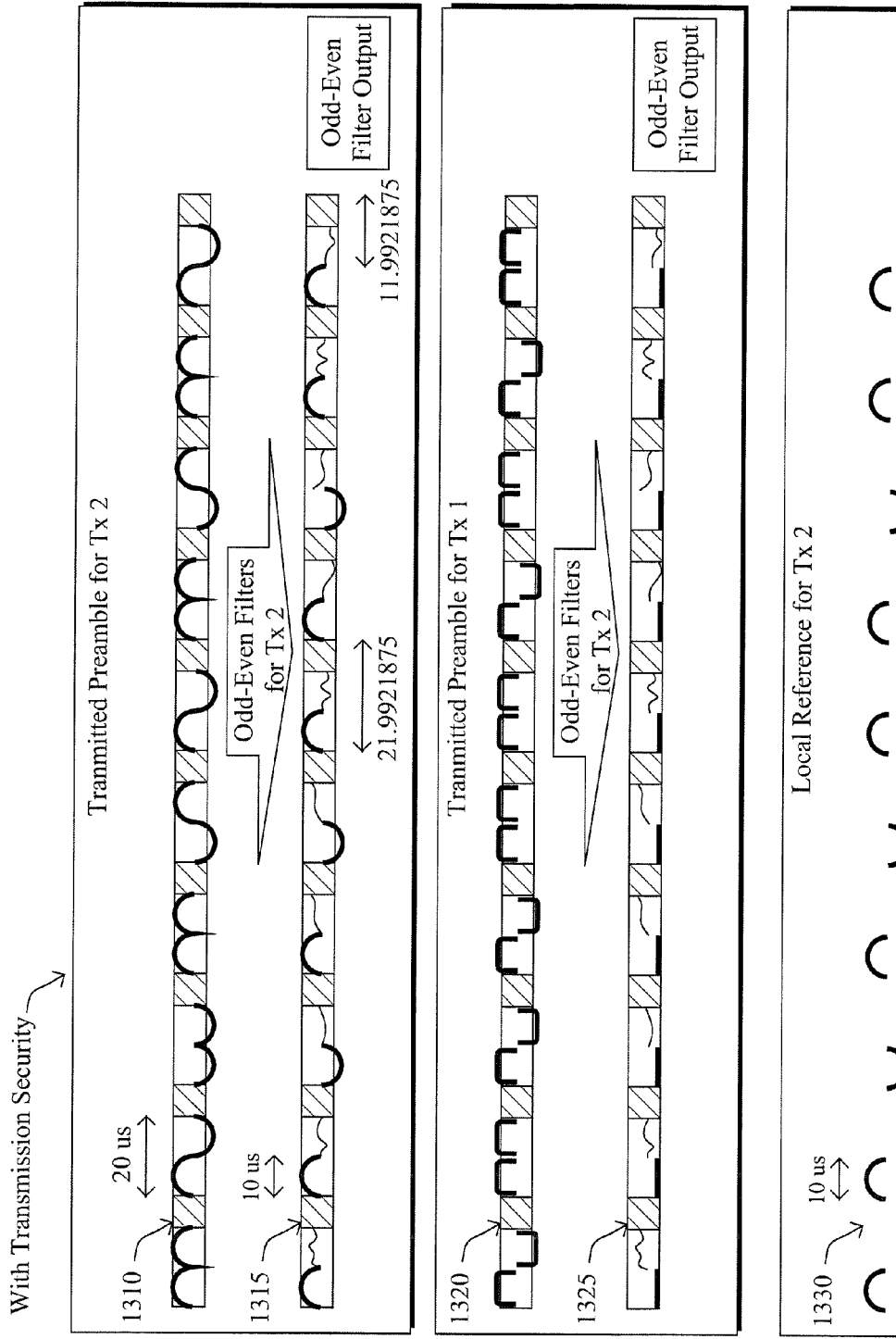
FIG. 17 illustrates an example filtering of an acquisition sequence with transmission security.

An example of this is shown in FIG. 17, where a selection of odd or even tone assignments may be made on a per-symbol basis. For instance, unlike FIG. 13 above, the following per-symbol tone assignments may be made for a ten-symbol sequence:

Tx1: odd (symbol 1), even, odd, odd, even, even, odd, even, odd, even (symbol 10).

Tx2: even (symbol 1), odd, even, even, odd, odd, even, odd, even, odd (symbol 10).

Alternatively, this arrangement may be shown as follows:
Symbol 1—TX1 odd, TX2 even;
Symbol 2—TX2 odd, TX1 even;
Symbol 3—TX1 odd, TX2 even;
Symbol 4—TX1 odd, TX2 even;
Symbol 5—TX2 odd, TX1 even; etc.

Note that the assignment/pattern may be shared between the transmitters and receiver(s) in advance of the transmission, such as through shared algorithms based on time of day, date, etc., or through communication of the security pattern in previous communications (e.g., a transec bit for each symbol indicating whether the symbol is odd or even for a given transmitter, referenced in FIGS. 16A+B as an input 1651 to the cross switch 1650 or in FIG. 15 as the port select inputs 1551 to each data input switch 1550). By knowing the security pattern, the transmitters and receiver(s) may securely communicate acquisition sequences, accordingly. That is, without knowing the pattern, a receiver would be essentially unable to synchronize to a particular transmitter.

As mentioned above, the use of two transmitters and even/odd frequencies is merely one possible arrangement. For instance, by spreading the distribution of tones across the bandwidth for each transmitter, the entire transmission bandwidth may be characterized for each transmitter. That is, each transmitter is provided a substantially similar distribution of the tones across the spectrum in order to characterize what the channel looks like (e.g., some tones faded, some not). Thus, the SNR may be estimated or determined on individual tones and symbols, allowing for robust system performance even where channel conditions may vary over the transmission of the complete waveform (e.g., varying conditions from symbol to symbol or group of symbols to group of symbols) or may vary over frequency. At the same time, however, this beneficial arrangement is not a necessity, and other groupings of frequencies that may be distinguishable by a receiver may also be used.

Furthermore, the use of a two transmitter diversity scheme is also a simplified example for the purpose of discussion. The embodiments herein are not so limited, and may be applied to any number of transmitters (e.g., 3, 4, . . . N). In these instances, the tones may be divided into distinct subsets such that tones within a particular distinct subset are separated by N−1 tones (e.g., dividing the tones into distinct subsets such that tones within a particular distinct subset are every Nth tone.) For example, for three transmitters, every third tone may be assigned to a particular transmitter, e.g., tones 1, 4, 7 . . . for Tx1, tones 2, 5, 8 . . . for Tx2, and tones 3, 6, 9 . . . for a transmitter Tx3. In this manner, generating the orthogonal acquisition sequence 700 (particularly symbols 710) by setting tones that are not part of the assigned subset for a corresponding transmitter to zero still results in a Fourier transform characteristic that is distinguishable from other acquisition sequence symbols for other assigned subsets of tones. For instance, by rearranging the filters 1210 (e.g., still using 2 tap filters), each portion of a symbol (e.g., each third for three transmitters, each quarter for four transmitters, etc.) may be isolated from the remaining portions, and filtered (added and/or subtracted) in a manner to produce either a zeroed signal or a "double" signal as noted above. Based on the outcomes of these isolated portions, it may be determined whether the acquisition symbol 710 originated from a particular transmitter, and receiver synchronization to the particular transmitter(s) may be performed, accordingly.

Figure 18:
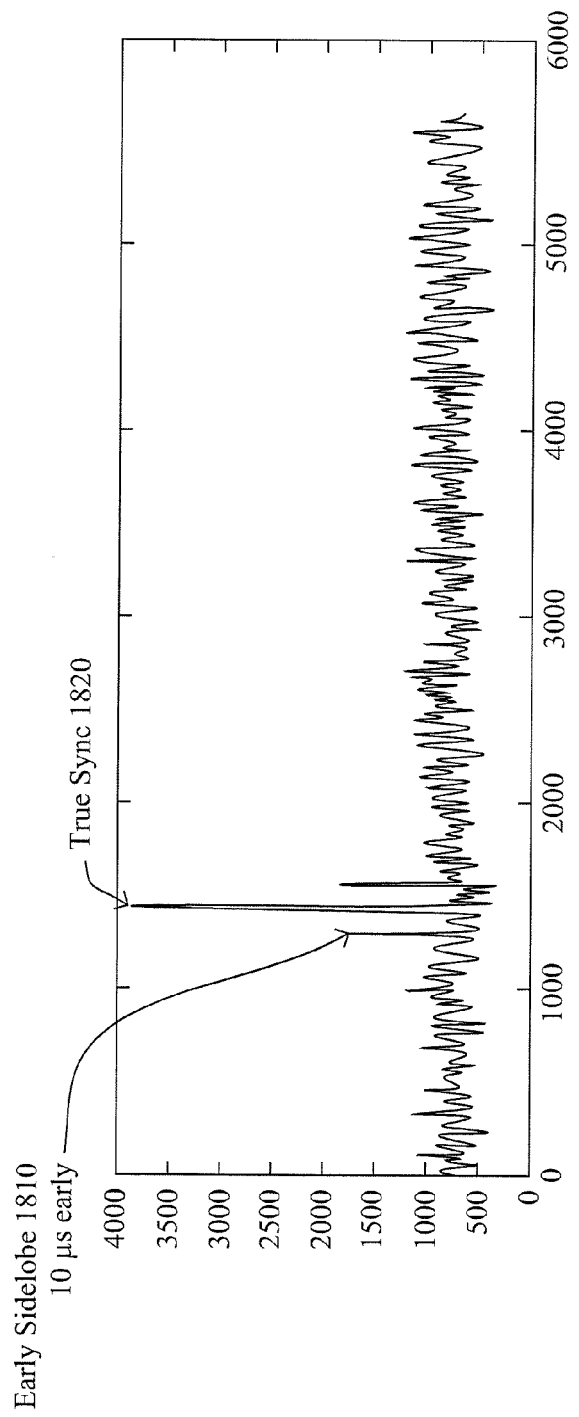
FIG. 18 illustrates an example of sidelobe occurrence.

Notably, as an additional consideration for any number of transmitters, time acquisition may complicated by the fact that a main acquisition crossing may be preceded by a lower crossing, e.g., 10 µs early (particularly based on two transmitters). For example, this "sidelobe" occurrence is shown in FIG. 18, where a sidelobe 1810 appears before a true synchronization 1820. According to one or more embodiments herein, a solution to counteract this effect is that once a threshold crossing occurs (e.g., a possible sidelobe 1810), the receiver may continue looking for a largest crossing over at least the next 10 µs. Since the receiver is already configured to look for a largest crossing over 20 µs to counter multipath effects, this search window need only be extended from the 20 µs search to a 30 µs search, accordingly.

Figure 19:
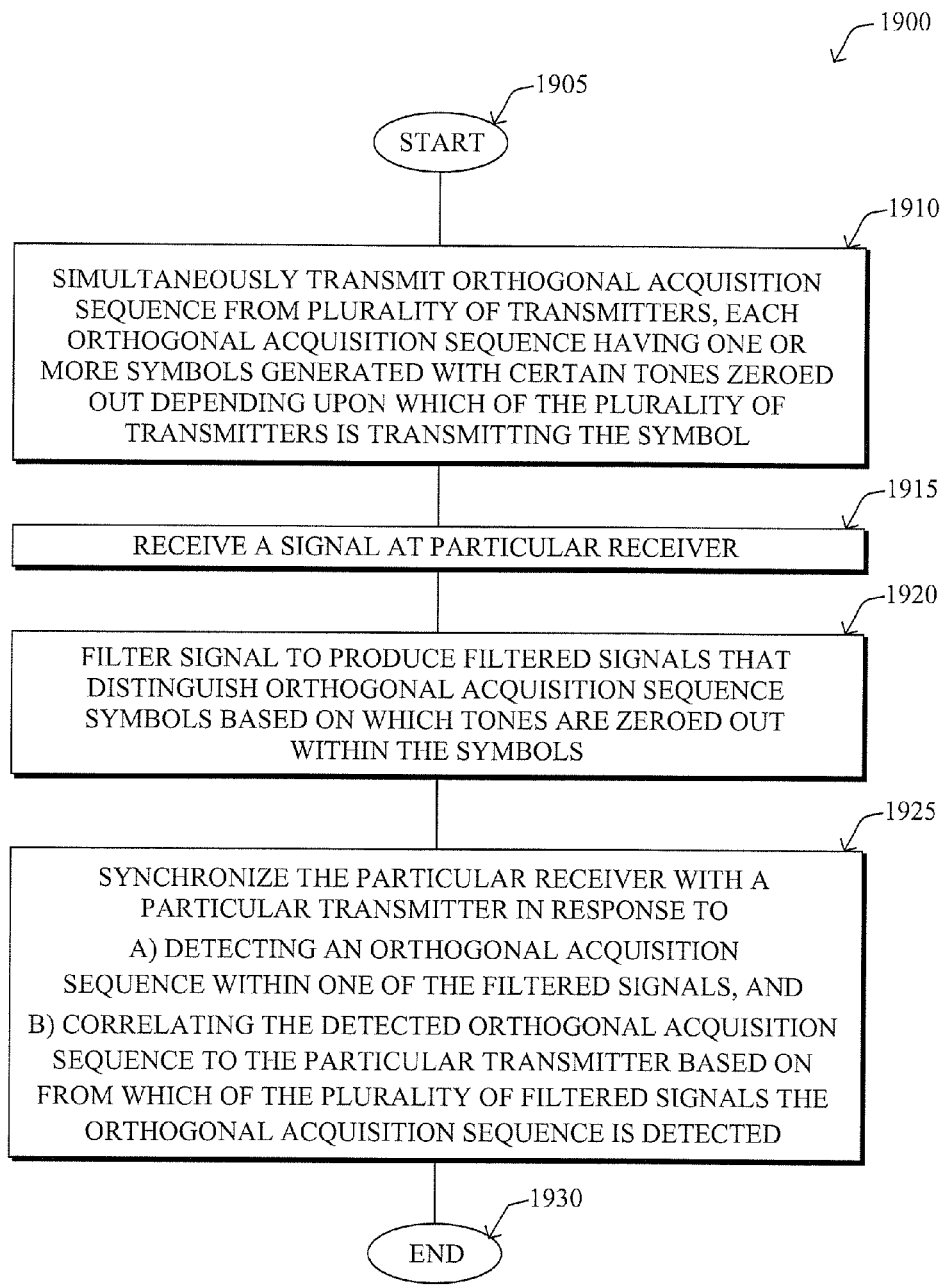
FIG. 19 illustrates a procedure for transmitter/receiver synchronization in systems employing transmit diversity.

In closing, FIG. 19 illustrates an example simplified procedure for synchronizing one or more receivers to diverse transmitters in accordance with one or more embodiments described herein. The procedure 1900 starts at step 1905, and continues to step 1910, where a plurality of transmitters (e.g., Tx1 ad Tx2) simultaneously transmit orthogonal acquisition sequences 700, each orthogonal acquisition sequence having one or more symbols 710 generated with certain tones zeroed out depending upon which of the plurality of transmitters is transmitting the symbol. A receiver (e.g., Rx1) may receive a signal in step 1915, and in step 1920 filters the signal to produce filtered signals 1220 that distinguish orthogonal acquisition sequence symbols based on which tones are zeroed out within the symbols, as described above. As also described above, in step 1925, the particular receiver (e.g., Rx1) may synchronize with a particular transmitter (e.g., Tx1 and/or Tx2) in response to a) detecting an orthogonal acquisition sequence within one of the filtered signals, and b) correlating the detected orthogonal acquisition sequence to the particular transmitter based on from which of the plurality of filtered signals the orthogonal acquisition sequence is detected. The procedure 1900 ends in step 1930, notably with an acquired transmitter such that continued data transmission may ensue.

Figure 20:
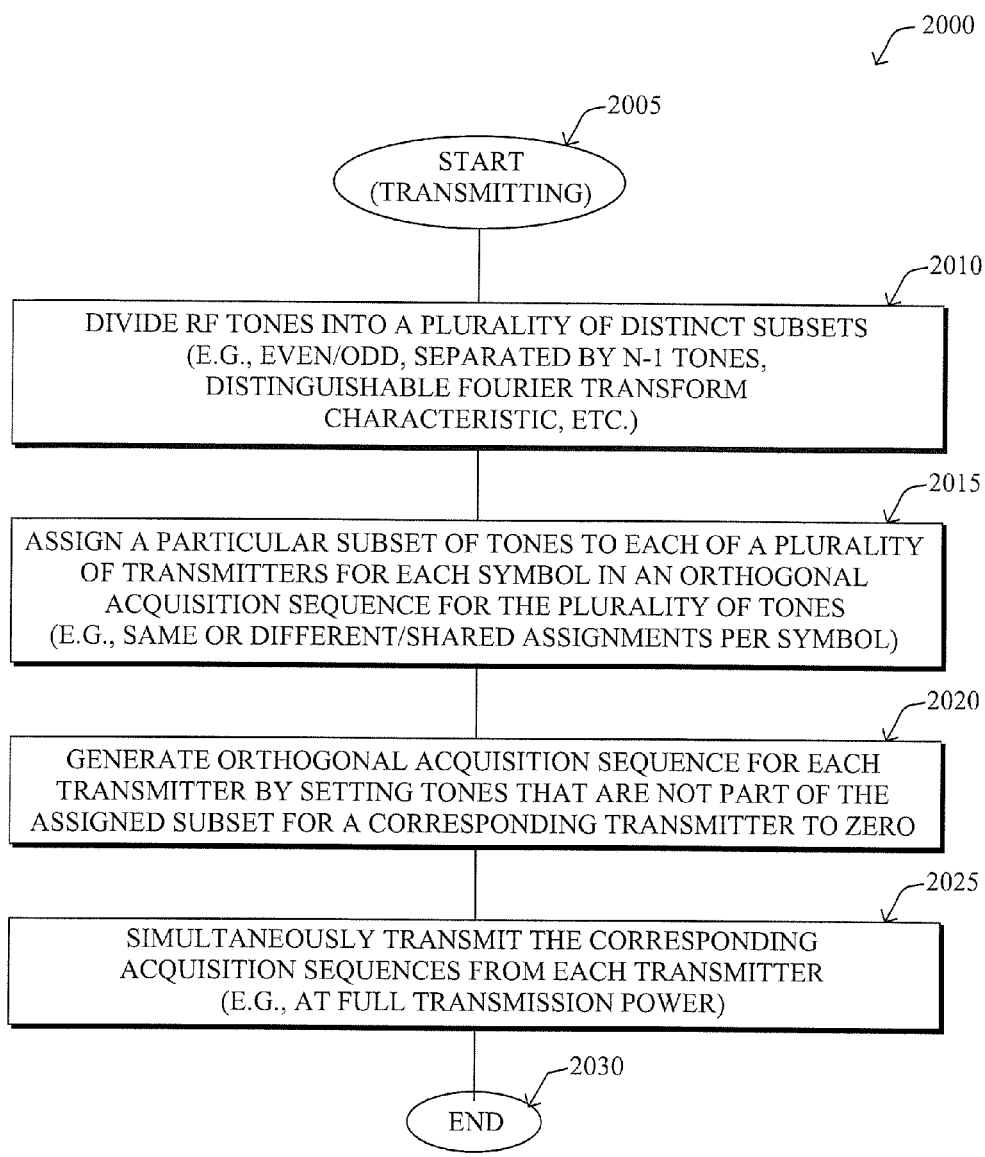
FIG. 20 illustrates a procedure for transmitter/receiver synchronization in systems employing transmit diversity from the perspective of the transmitter.

In slightly more detail, from the perspective of a transmitter (Tx1 and/or Tx2) or transmitting device 110, generally, FIG. 20 illustrates an example simplified procedure for receiver synchronization in accordance with one or more embodiments described herein. The procedure 2000 starts at step 2005, and continues to step 2010, where RF tones may be divided into a plurality of distinct subsets (e.g., even/odd, separated by N−1 tones, distinguishable Fourier transform characteristic, etc.) as mentioned above. In addition, in step 2015, a particular subset of tones may be assigned to each of a plurality of transmitters (e.g., Tx1 and Tx2) for each symbol 310 in an orthogonal acquisition sequence 700 for the plurality of tones. For example, as noted above, each sequence may simply have all of its symbols share the same subset assignment (e.g., Tx1 all even tones and Tx2 all odd tones), or for transmission security, the assignments may be different per symbol (e.g., Tx1 odd for the first symbol, even for the second symbol, even for the third symbol, odd for the fourth symbol, etc., and Tx2 the inverse of Tx1's assignments). Note that if in step 2015 the assignments are different, the assignments are shared with the receivers (e.g., Rx1) in order to allow the receivers to decode the assignments appropriately.

In step 2020, an orthogonal acquisition sequence 700 may be generated for each transmitter by setting tones that are not part of the assigned subset for a corresponding transmitter to zero. In step 2025, the transmitters may simultaneously transmit their corresponding acquisition sequences to any interested receiver for processing. Illustratively, as described above, based on certain tones being set to zero, each acquisition symbol results in a distinguishable characteristic to a receiver (through IFFT processing) in order to determine which transmitter transmitted the symbol. Note also that as mentioned above, the sequence's transmission may be at full transmitter power, such that the power conventionally allocated to the zeroed out tones may be re-allocated to the non-zeroed-out tones, accordingly. The procedure 2000 for the transmitting device ends in step 2030.

Figure 21:
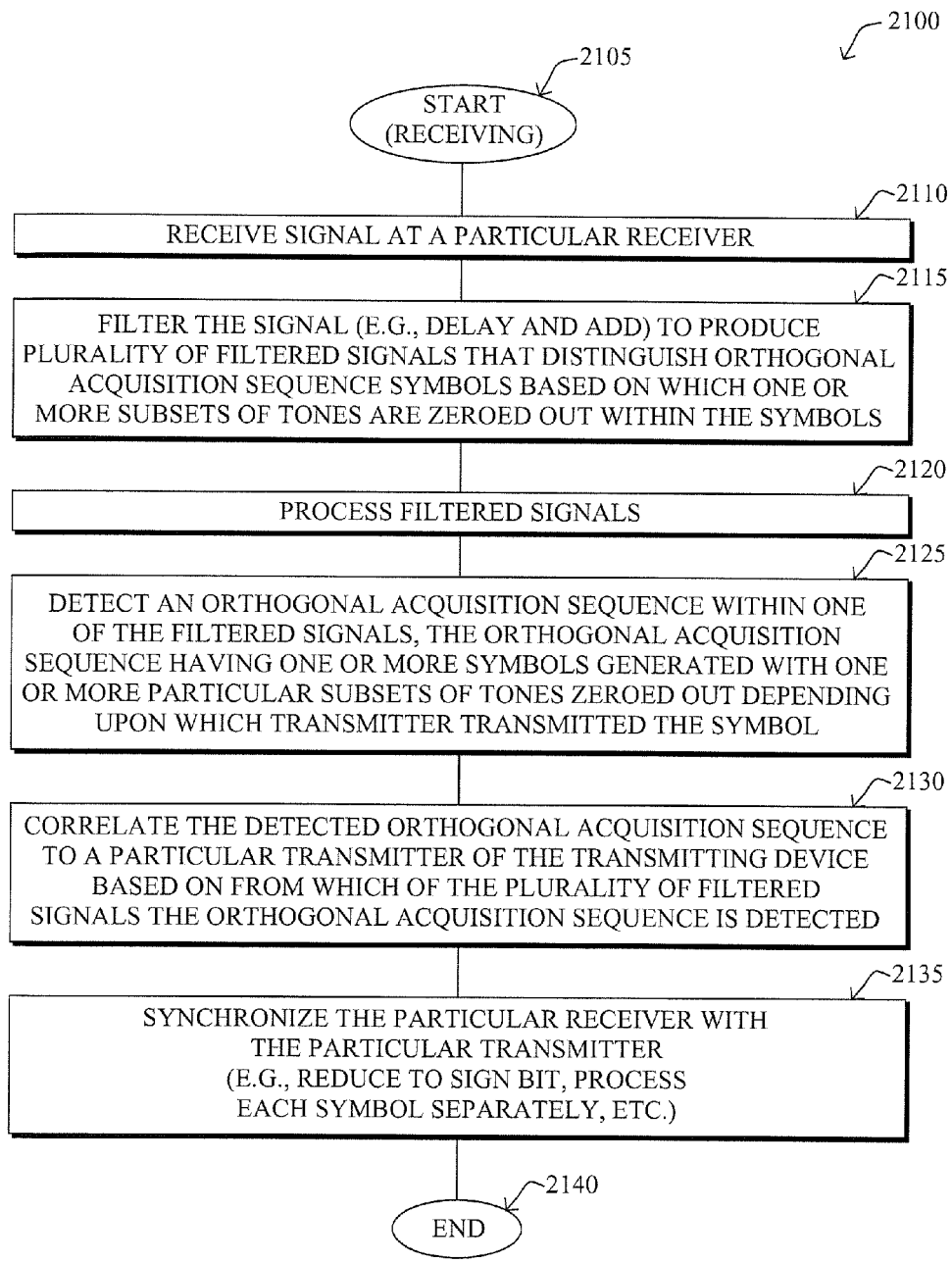
FIG. 21 illustrates a procedure for transmitter/receiver synchronization in systems employing transmit diversity from the perspective of the receiver.

FIG. 21 illustrates an example simplified procedure for receiver synchronization in accordance with one or more embodiments described herein, e.g., from the perspective of a receiving device 120 (receiver, e.g., Rx1). The procedure 2100 starts at step 2105, and continues to step 2110, where the receiver receives a signal 130 from one or more transmitters. In step 2115, the receiver may filter the signal (e.g., delay and add, as mentioned above) to produce plurality of filtered signals 1220 that distinguish orthogonal acquisition sequence symbols 710 based on which one or more subsets of tones are zeroed out within the symbols. The filtered signals may then be processed in step 2120 to determine whether symbols exist.

In particular, the receiver may detect an orthogonal acquisition sequence within one of the filtered signals in step 2125, specifically where the orthogonal acquisition sequence has one or more symbols generated with one or more particular subsets of tones zeroed out depending upon which transmitter transmitted the symbol as noted above. Accordingly, in step 2130, the receiver may also correlate the detected orthogonal acquisition sequence to a particular transmitter (e.g., Tx1 or Tx2) of the transmitting device 110 based on from which of the plurality of filtered signals the orthogonal acquisition sequence is detected. For instance, as described above, the detection and correlation in step 2125 and 2130 may illustratively be embodied as first splitting/filtering the received signal into two components based on zeroed out tones (correlated to particular transmitters), and then detecting a symbol is in a first filtered stream and/or a symbol on a second filtered stream, etc.

In step 2135, the receiver may be synchronized with the particular transmitter corresponding to the detected and correlated symbol. For example, as described above, processing the detected symbols may be simplified for acquisition/synchronization. That is, in certain embodiments, the receiver may reduce the filtered signals to their corresponding sign bits (+/−) to process the symbols. Also, in certain embodiments mentioned above, a multi-symbol sequence 700 may have each symbol processed separately and the results may then be non-coherently combined. The procedure 2100 ends in step 2140, having the receiver synchronized to the transmitter(s) for reception and recovery of subsequently transmitted data.

Advantageously, as noted above, the techniques herein provide for full synchronization performance with particularly low computation expense when transmit diversity is utilized. In particular, by generating distinguishable synchronization sequences using pseudonoise excitation of a discrete Fourier transform based on only certain frequencies (e.g., even or odd), the novel techniques allow for simplified synchronization for diverse transmitters (e.g., MIMO/MISO), as well as allowing for simultaneous acquisition to the diverse transmitters, alleviating the need for increased (multiplied) acquisition times. In addition, by separating the acquisition sequences at the transmitters based on different frequencies, the receivers' processing to separate the sequences is simplified. Further simplification may be achieved through, e.g., reduction of diversity correlator precision subsequent to the separation of orthogonal synchronization components, as well as through processing each symbol separately and non-coherently combining the results. These simplifications allow for the processing cost for acquisition in transmit diversity topologies to be equal to or less than the processing cost for receiving the data in the transmit diversity topologies (that is, no more complex processing is required than that to simply receive and recover the data itself).

While there have been shown and described illustrative embodiments that provide efficient receiver synchronization during transmit diversity, it is to be understood that various other adaptations and modifications may be made within the spirit and scope of the is embodiments herein. For example, the embodiments have been shown and described herein with relation to particular communication schemes, such as OFDM communication. However, the embodiments in their broader sense are not so limited, and may, in fact, be used with other types of communication suitable for orthogonal acquisition symbols. Also, while the techniques described above reference certain frequency spacing (channels, tones, etc.), those skilled in the art will appreciate that other frequency divisions may be utilized in accordance with the embodiments herein, and those shown herein are merely illustrative examples.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. For example, while the description above relates to certain hardware components that perform various functionality, those skilled in the art will appreciate that the techniques herein are equally applicable to software based radio communication. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for use by a transmitting device having a plurality of transmitters in communication with a receiving device having a plurality of receivers, the method comprising:
   dividing, by the transmitting device, a plurality of radio frequency tones into a plurality of distinct subsets of tones;
   assigning, by the transmitting device, a particular subset of the plurality of distinct subsets of tones to each respective transmitter of the plurality of transmitters for each symbol in an orthogonal acquisition sequence having a plurality of symbols for the plurality of radio frequency tones;
   generating, by the transmitting device, a respective orthogonal acquisition sequence for each transmitter of the plurality of transmitters, the generating further comprising setting tones that are not part of the assigned particular subset of tones for each respective transmitter of the plurality of transmitters to zero for each symbol of the respective orthogonal acquisition sequence of that transmitter; and
   simultaneously transmitting the generated orthogonal acquisition sequences on the assigned particular subsets from the plurality of transmitters, respectively;
   wherein the plurality of transmitters comprises N transmitters, and wherein the tones within each respective particular subset of the plurality of distinct subsets of tones are separated by N−1 tones, wherein N=2, and wherein the plurality of distinct subsets of tones are odd tones and even tones; and
   the receiving device having a received signal originating from the transmitter device and is configured to perform filtering, the filtering comprising:
   delaying the received signal for ½ the length of a symbol to produce a delayed signal;
   subtracting the received signal from the delayed signal to filter for the symbols transmitted on only the odd tones; and
   adding the received signal to the delayed signal to filter for the symbols transmitted on only the even tones.

2. The method as in claim 1, wherein the assigned particular subset for each symbol of the respective orthogonal acquisition sequence results in a Fourier transform characteristic that is distinguishable from other orthogonal acquisition sequence symbols for other assigned particular subset(s) of tones.

3. The method as in claim 1, wherein the assigning comprises:
   assigning the same subset of tones to a transmitter of the plurality of transmitters for each symbol in the respective orthogonal acquisition sequence for that transmitter.

4. The method as in claim 1, wherein the assigning comprises assigning a different subset of tones to a transmitter of the plurality of transmitters for one or more symbols in the respective orthogonal acquisition sequence for that transmitter, the method further comprising:
   sharing the assignment of the different subset of tones with one or more of the plurality of receivers.

5. The method as in claim 1, wherein the plurality of transmitters are each configured with a total transmission power, wherein simultaneously transmitting further comprises:
   transmitting the respective orthogonal acquisition sequence from the respective transmitter of the plurality of transmitters with substantially total transmission power such that power normally allotted to the zeroed out tones is applied to the assigned particular subset of tones for that corresponding acquisition sequence.

6. A method for use by a receiving device having one or more receivers in communication with a transmitting device having a plurality of transmitters, the method comprising:
   receiving a signal from the plurality of transmitters;
   filtering the received signal to produce a plurality of filtered signals that distinguish symbols of an orthogonal acquisition sequence based on which radio frequency tones are zeroed out within the symbols;
   detecting the orthogonal acquisition sequence within one of the filtered signals, the orthogonal acquisition sequence symbols are generated from subsets of the radio frequency tones with certain tones zeroed out depending upon which one of the plurality of transmitters transmitted the symbols of the orthogonal acquisition sequence;
   correlating the detected orthogonal acquisition sequence to a corresponding transmitter of the transmitting device based on from which of the plurality of filtered signals the orthogonal acquisition sequence is detected; and
   synchronizing the one or more receivers with the corresponding transmitter wherein the plurality of transmitters comprises N transmitters, and wherein the subsets of tones are based on dividing tones into distinct subsets of tones such that tones within a particular distinct subset of tones are separated by N−1 tones, wherein N=2, and wherein the subsets of tones are odd tones and even tones, wherein the filtering further comprises:
   delaying the received signal for ½ the length of a symbol to produce a delayed signal;
   subtracting the received signal from the delayed signal to filter for symbols transmitted on only the odd tones; and
   adding the received signal to the delayed signal to filter for symbols transmitted on only the even tones.

7. The method as in claim 6, further comprising:
   receiving the plurality of symbols within the orthogonal acquisition sequence;
   processing each of the symbols separately; and
   cumulating the results of processing each of the symbols separately to synchronize the receiver with the corresponding transmitter.

8. The method as in claim 6, further comprising:
   reducing the filtered signals to a sign bit representation; and
   processing the reduced filtered signals based on the sign bit representation.

9. The method as in claim 6, wherein the one or more particular distinct subsets of tones are based on dividing a plurality of radio frequency tones into the distinct subsets of tones such that generating the orthogonal acquisition sequence by setting tones that are not part of the assigned subset of tones for the corresponding transmitter to zero for each symbol of the corresponding acquisition sequence results in a Fourier transform characteristic that is distinguishable from other acquisition sequence symbols for other assigned subsets of tones.

10. The method as in claim 6, further comprising:
receiving the plurality of symbols within the orthogonal acquisition sequence, wherein the same subset of tones belong to the corresponding transmitter for each symbol in the orthogonal acquisition sequence for that corresponding transmitter.

11. A method, comprising:
simultaneously transmitting an orthogonal acquisition sequence from each of a plurality of transmitters, the orthogonal acquisition sequence having symbols for a plurality of radio frequency tones, the symbols for the plurality of transmitters are generated from subsets of the plurality of radio frequency tones with certain tones zeroed out depending upon which one of the plurality of transmitters is transmitting the symbols of the orthogonal acquisition sequence;
receiving a signal at a particular receiver from the plurality of transmitters;
filtering, by a filter, the received signal to produce a plurality of filtered signals that distinguish symbols of the orthogonal acquisition sequence based on which certain tones of the plurality of tones are zeroed out within the symbols; and
synchronizing the particular receiver with a corresponding transmitter of the plurality of transmitters in response to a) detecting the orthogonal acquisition sequence from the corresponding transmitter within one of the filtered signals and b) correlating the detected orthogonal acquisition sequence to the corresponding transmitter based on from which of the plurality of filtered signals the orthogonal acquisition sequence is detected,
wherein the plurality of transmitters comprises N transmitters, and wherein the subsets of tones are based on dividing the plurality of tones into distinct subsets of tones such that tones within a particular distinct subset of tones are separated by N−1 tones, and wherein N=2, and wherein the subsets of tones are odd tones and even tones, wherein the filter is further configured to:
delay the received signal for ½ the length of a symbol to produce a delayed signal;
subtract the received signal from the delayed signal to filter for symbols transmitted on only the odd tones; and
add the received signal to the delayed signal to filter for symbols transmitted on only the even tones.

12. A system, comprising:
a transmitting device comprising:
a plurality of transmitters; and
a processor configured to:
divide a plurality of radio frequency tones into a plurality of distinct subsets of tones;
assign a particular subset of the plurality of distinct subsets of tones to each respective transmitter of the plurality of transmitters for each symbol in an orthogonal acquisition sequence having a plurality of symbols for the plurality of radio frequency tones;
generate a respective orthogonal acquisition sequence for each respective transmitter of the plurality of transmitters by setting tones that are not part of the assigned particular subset of tones for each respective transmitter to zero for each symbol of the respective orthogonal acquisition sequence of that transmitter;
wherein each of the plurality of transmitters is configured to simultaneously transmit the generated orthogonal acquisition sequence on the assigned particular subset with the other plurality of transmitters;
wherein the plurality of transmitters comprises N transmitters, and wherein the tones within each respective particular subset of the plurality of distinct subsets of tones are separated by N−1 tones, and wherein N=2, and wherein the plurality of distinct subsets of tones are odd tones and even tones, and
a receiver configured to receive a received signal originating from the plurality of transmitters, the receiver includes a filter, the filter is configured to:
delay the received signal for ½ the length of a symbol to produce a delayed signal;
subtract the received signal from the delayed signal to filter for symbols transmitted on only the odd tones; and
add the received signal to the delayed signal to filter for symbols transmitted on only the even tones.

13. An apparatus, comprising:
at least one receiver configured to receive a signal having a plurality of radio frequency tones from a plurality of transmitters, the received signal having symbols of an orthogonal acquisition sequence, each one of the symbols having a subset of tones from the radio frequency tones;
at least one filter configured to filter the received signal to produce a plurality of filtered signals that distinguish symbols of the orthogonal acquisition sequence based on which subsets of tones are zeroed out within the symbols; and
a processor configured to:
detect the orthogonal acquisition sequence within one of the filtered signals, the symbols of the orthogonal acquisition sequence are generated with subsets of tones zeroed out depending upon which one of the plurality of transmitters transmitted the symbols of the orthogonal acquisition sequence;
correlate the detected orthogonal acquisition sequence to a corresponding transmitter of the plurality of transmitters based on from which of the plurality of filtered signals the orthogonal acquisition sequence is detected; and
synchronize the at least one receiver with the corresponding transmitter;
wherein the plurality of transmitters comprises N transmitters, and wherein the subsets of tones are based on dividing the plurality of tones into distinct subsets of tones such that tones within a particular distinct subset of tones are separated by N−1 tones, and wherein N=2, and wherein the subsets of tones are odd tones and even tones, wherein the at least one filter is further configured to:
delay the received signal for ½ the length of a symbol to produce a delayed signal;
subtract the received signal from the delayed signal to filter for symbols transmitted on only the odd tones; and
add the received signal to the delayed signal to filter for symbols transmitted on only the even tones.

14. The apparatus as in claim 13, wherein the processor is further configured to:
process each of the symbols separately; and
cumulate the results of processing each of the symbols separately to synchronize the at least one receiver with the corresponding transmitter.

15. The apparatus as in claim 13, wherein the processor is further configured to:
reduce the filtered signals to a sign bit representation; and
process the reduced filtered signals based on the sign bit representation.

16. The apparatus as in claim 13, wherein either:
a) the same subset of tones belong to a transmitter of the plurality of transmitters for each symbol in the corresponding orthogonal acquisition sequence for that transmitter; or
b) a different subset of tones belong to a transmitter of the plurality of transmitters for one or more symbols in the corresponding orthogonal acquisition sequence for that transmitter according to an assignment, wherein the assignment is shared between the plurality of transmitters and the at least one receiver.

* * * * *